US012609767B2

(12) United States Patent
Ferreira Pedro et al.

(10) Patent No.: US 12,609,767 B2
(45) Date of Patent: Apr. 21, 2026

(54) SYSTEM AND METHOD FOR PROVIDING TRANSIENT RESILIENT TRANSMISSIONS IN AN OPTICAL NETWORK

(71) Applicant: Xieon Networks S.a.r.l., Luxembourg (LU)

(72) Inventors: João Manuel Ferreira Pedro, Lisbon (PT); António Miguel Barata da Eira, Lisbon (PT); Diogo Miguel Cigarro Morão, Lisbon (PT)

(73) Assignee: Xieon Networks S.a.r.l., Luxembourg (LU)

( * ) Notice: Subject to any disclaimer, the term of this patent is extended or adjusted under 35 U.S.C. 154(b) by 298 days.

(21) Appl. No.: 18/401,575

(22) Filed: Dec. 31, 2023

(65) Prior Publication Data

US 2025/0175249 A1      May 29, 2025

Related U.S. Application Data

(60) Provisional application No. 63/602,643, filed on Nov. 26, 2023.

(51) Int. Cl.
    *H04B 10/038*    (2013.01)
    *H04B 10/079*    (2013.01)
    (Continued)

(52) U.S. Cl.
    CPC ....... *H04B 10/038* (2013.01); *H04B 10/0791* (2013.01); *H04B 10/03* (2013.01);
    (Continued)

(58) Field of Classification Search
    CPC .. H04B 10/038; H04B 10/0791; H04B 10/03; H04B 10/07; H04J 14/0227; H04J 14/0267; H04J 14/0269; H04J 14/0271; H04Q 11/0005; H04Q 11/0062; H04Q 2011/0073; H04Q 2011/0079; H04Q 2011/0081; H04Q 2011/0083
    (Continued)

(56) References Cited

U.S. PATENT DOCUMENTS 6,259,673 B1 * 7/2001 Yoshihara ............... H04L 45/10
                                                 370/351
6,377,551 B1 * 4/2002 Luo ....................... H04L 45/306
                                                 370/351

(Continued)

*Primary Examiner* — Dibson J Sanchez

(57) ABSTRACT

A system and method are disclosed to at least reduce a risk to optical network transmission performance presented by transient events, by developing and implementing provisioning instructions for routing resources in the optical network in a manner configured to reduce such risk. The system and method may selectively bias an optical channel provisioning process to preferentially select optical network configurations leading to improved transient resilience of the optical network. As a result, the optical network for example may route at least one optical channel through a specific connection path based at least in part upon the provisioning instructions. These provisioning instructions may be determined, for example, based at least in part upon a service request for transmitting resources in the at least one optical channel between two nodes and information relating to a configuration and capabilities of the at least one optical channel.

20 Claims, 7 Drawing Sheets

(51) Int. Cl.

| | |
|---|---|
| *H04B 10/03* | (2013.01) |
| *H04B 10/07* | (2013.01) |
| *H04J 14/02* | (2006.01) |
| *H04Q 11/00* | (2006.01) |

(52) U.S. Cl.
CPC ........... *H04B 10/07* (2013.01); *H04J 14/0227* (2013.01); *H04J 14/0267* (2013.01); *H04J 14/0269* (2013.01); *H04J 14/0271* (2013.01); *H04Q 11/0005* (2013.01); *H04Q 11/0062* (2013.01); *H04Q 2011/0073* (2013.01); *H04Q 2011/0079* (2013.01); *H04Q 2011/0081* (2013.01); *H04Q 2011/0083* (2013.01)

(58) Field of Classification Search
USPC ................................. 398/1–8, 9–38, 43–103
See application file for complete search history.

(56) References Cited

U.S. PATENT DOCUMENTS

| | | | | |
|---|---|---|---|---|
| 6,937,821 | B1 * | 8/2005 | Heath .............. | H04B 10/07955 398/94 |
| 7,395,351 | B1 * | 7/2008 | Nucci ..................... | H04L 45/22 709/239 |
| 7,496,650 | B1 * | 2/2009 | Previdi ................... | H04L 45/48 370/254 |
| 7,609,964 | B2 * | 10/2009 | Peddanarappagari ....................... | H04B 10/07955 398/94 |
| 7,779,065 | B2 * | 8/2010 | Gupta ..................... | H04L 45/02 709/239 |
| 9,054,831 | B2 * | 6/2015 | Prakash .............. | H04J 14/0269 |
| 9,602,390 | B2 * | 3/2017 | Yamada ............... | H04L 45/124 |
| 11,201,816 | B2 * | 12/2021 | Fiaschi ................. | H04L 45/123 |
| 2003/0058798 | A1 * | 3/2003 | Fleischer .............. | H04L 45/123 370/241 |
| 2003/0095500 | A1 * | 5/2003 | Cao ..................... | H04J 14/0227 370/242 |
| 2003/0198474 | A1 * | 10/2003 | Mooney ................. | H03K 5/082 398/140 |
| 2004/0071089 | A1 * | 4/2004 | Bauer ................. | H04Q 11/0478 370/395.21 |
| 2004/0156316 | A1 * | 8/2004 | Mukherjee .............. | H04L 47/15 370/235 |
| 2004/0205239 | A1 * | 10/2004 | Doshi ..................... | H04L 45/50 709/241 |
| 2004/0247317 | A1 * | 12/2004 | Sadananda .............. | H04L 45/62 398/57 |
| 2005/0038909 | A1 * | 2/2005 | Yoshiba .................. | H04L 45/16 709/241 |
| 2005/0078656 | A1 * | 4/2005 | Bryant .................. | H04L 45/123 370/351 |
| 2005/0113098 | A1 * | 5/2005 | Cankaya ............. | H04J 14/0227 455/445 |
| 2005/0213971 | A1 * | 9/2005 | Amemiya .............. | H04L 45/62 398/45 |
| 2006/0023297 | A1 * | 2/2006 | Kilper ................. | H04J 14/0221 359/337 |
| 2007/0036544 | A1 * | 2/2007 | Fukashiro ........... | H04J 14/0227 398/19 |
| 2009/0162075 | A1 * | 6/2009 | Naito ...................... | H04L 45/00 398/182 |
| 2009/0214199 | A1 * | 8/2009 | Fukai .................... | H04L 45/125 398/7 |
| 2011/0188865 | A1 * | 8/2011 | Lalonde ............. | H04J 14/0269 398/156 |
| 2013/0258841 | A1 * | 10/2013 | Parsons ................. | H04L 41/142 370/228 |
| 2013/0302026 | A1 * | 11/2013 | Hashiguchi ......... | H04J 14/0257 398/2 |
| 2015/0055953 | A1 * | 2/2015 | Guy .................... | H04J 14/0269 398/48 |
| 2017/0093487 | A1 * | 3/2017 | Grammel .......... | H04B 10/0773 |
| 2017/0302567 | A1 * | 10/2017 | Lan .......................... | H04L 45/16 |
| 2020/0076499 | A1 * | 3/2020 | Al Sayeed ............ | H04J 14/021 |
| 2021/0050915 | A1 * | 2/2021 | Lee .......................... | H04L 45/50 |
| 2022/0078087 | A1 * | 3/2022 | Grant ..................... | H04L 45/03 |
| 2022/0360333 | A1 * | 11/2022 | Moore .............. | H04B 10/0795 |
| 2023/0275656 | A1 * | 8/2023 | Al Sayeed ......... | H04B 10/0791 398/13 |
| 2025/0220326 | A1 * | 7/2025 | Pedro ................. | H04Q 11/0062 |

\* cited by examiner

PROCESS 400

PROCESS 400

FROM 418
(FIG. 4A)

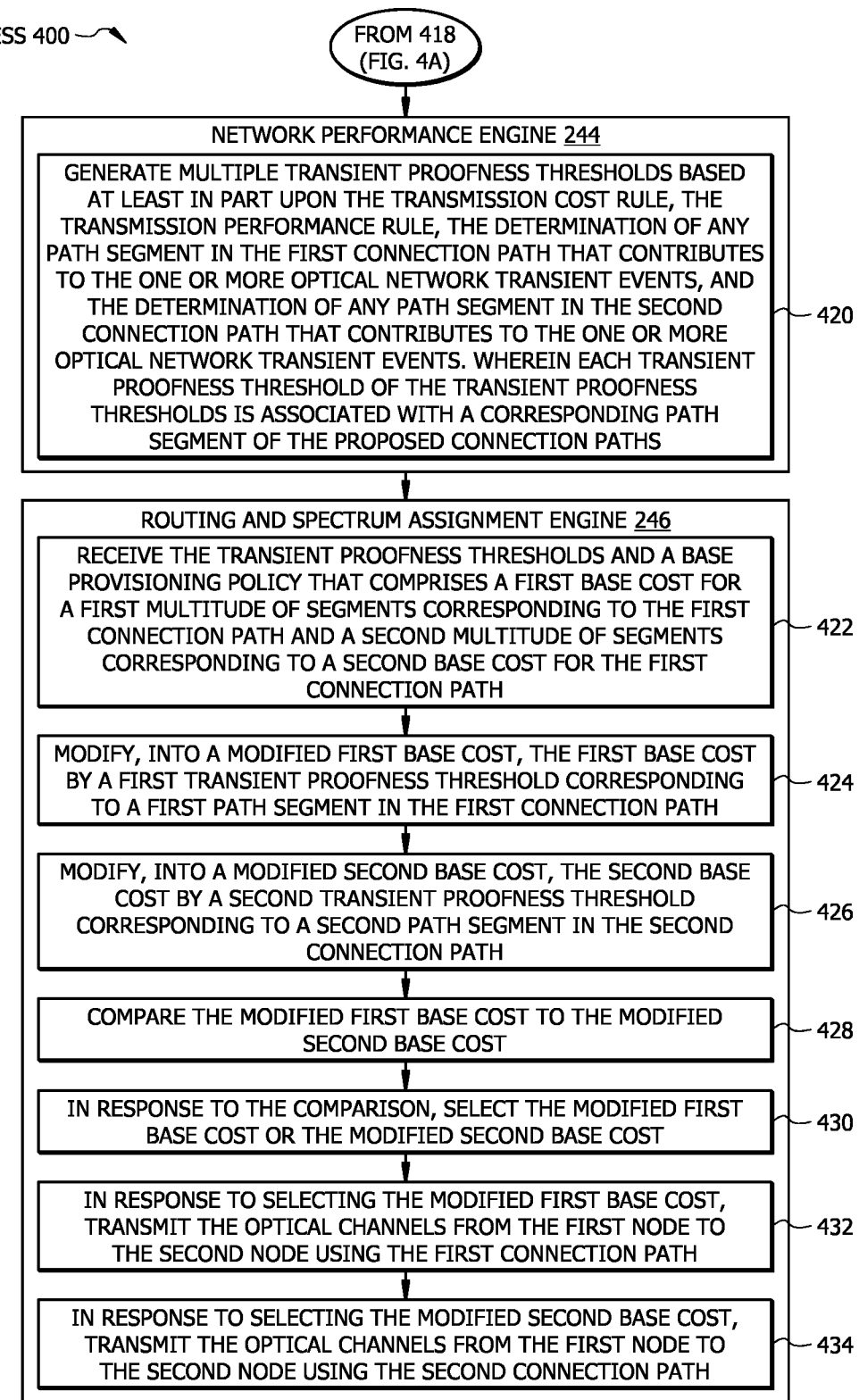

NETWORK PERFORMANCE ENGINE 244

GENERATE MULTIPLE TRANSIENT PROOFNESS THRESHOLDS BASED AT LEAST IN PART UPON THE TRANSMISSION COST RULE, THE TRANSMISSION PERFORMANCE RULE, THE DETERMINATION OF ANY PATH SEGMENT IN THE FIRST CONNECTION PATH THAT CONTRIBUTES TO THE ONE OR MORE OPTICAL NETWORK TRANSIENT EVENTS, AND THE DETERMINATION OF ANY PATH SEGMENT IN THE SECOND CONNECTION PATH THAT CONTRIBUTES TO THE ONE OR MORE OPTICAL NETWORK TRANSIENT EVENTS. WHEREIN EACH TRANSIENT PROOFNESS THRESHOLD OF THE TRANSIENT PROOFNESS THRESHOLDS IS ASSOCIATED WITH A CORRESPONDING PATH SEGMENT OF THE PROPOSED CONNECTION PATHS — 420

ROUTING AND SPECTRUM ASSIGNMENT ENGINE 246

RECEIVE THE TRANSIENT PROOFNESS THRESHOLDS AND A BASE PROVISIONING POLICY THAT COMPRISES A FIRST BASE COST FOR A FIRST MULTITUDE OF SEGMENTS CORRESPONDING TO THE FIRST CONNECTION PATH AND A SECOND MULTITUDE OF SEGMENTS CORRESPONDING TO A SECOND BASE COST FOR THE FIRST CONNECTION PATH — 422

MODIFY, INTO A MODIFIED FIRST BASE COST, THE FIRST BASE COST BY A FIRST TRANSIENT PROOFNESS THRESHOLD CORRESPONDING TO A FIRST PATH SEGMENT IN THE FIRST CONNECTION PATH — 424

MODIFY, INTO A MODIFIED SECOND BASE COST, THE SECOND BASE COST BY A SECOND TRANSIENT PROOFNESS THRESHOLD CORRESPONDING TO A SECOND PATH SEGMENT IN THE SECOND CONNECTION PATH — 426

COMPARE THE MODIFIED FIRST BASE COST TO THE MODIFIED SECOND BASE COST — 428

IN RESPONSE TO THE COMPARISON, SELECT THE MODIFIED FIRST BASE COST OR THE MODIFIED SECOND BASE COST — 430

IN RESPONSE TO SELECTING THE MODIFIED FIRST BASE COST, TRANSMIT THE OPTICAL CHANNELS FROM THE FIRST NODE TO THE SECOND NODE USING THE FIRST CONNECTION PATH — 432

IN RESPONSE TO SELECTING THE MODIFIED SECOND BASE COST, TRANSMIT THE OPTICAL CHANNELS FROM THE FIRST NODE TO THE SECOND NODE USING THE SECOND CONNECTION PATH — 434

*FIG. 4B*

GRAPH 500

SYSTEM AND METHOD FOR PROVIDING TRANSIENT RESILIENT TRANSMISSIONS IN AN OPTICAL NETWORK

CROSS-REFERENCE TO RELATED APPLICATION

This application claims priority to U.S. Provisional Patent Application Ser. No. 63/602,643, filed on Nov. 26, 2023, the entire contents of which is hereby incorporated by reference as if set forth fully herein.

TECHNICAL FIELD

The present disclosure relates generally to optical networks and management of optical networks, and more specifically to a system and method for providing transient-resilient transmissions in an optical network.

BACKGROUND

Optical wavelength-division multiplexed (WDM) networks typically comprise links—sometimes also called segments—that connect network node pairs using fiber optic cable(s) for example, so as to establish the network. The resulting network may for example form a ring or a mesh. Interruptions (e.g., cuts, breaks, disconnections, etc.) and/or other events (e.g., power surges, etc.) may disrupt or otherwise impact operation of the optical network. Impactful events may occur for example at one or more links, or at one or more nodes, and/or any combination thereof. A transient event is an event in which one or more transients—i.e., fluctuations, variations, or other changes in power-over-frequency or spectral resource profile (for simplicity, hereinafter "power profile") at a given optical network location—is/are introduced in the optical network. Typically among the more challenging of transients from an ongoing network operations perspective is for example a meaningful change in power profile that is relatively sudden and/or unmitigated, particularly in relation to those pre-existing optical channel resources of the power profile that survive the transient event. A given unmitigated transient might be significant enough to itself cause traffic loss or otherwise adversely impact optical transmission performance of one or more surviving optical channels communicating in the optical network.

SUMMARY OF THE DISCLOSURE

In an optical network, spectral resources may be assigned to one or more optical channels to be transmitted between two network components (hereinafter also referred to as nodes) interconnected in an optical network. For example, the two nodes may be interconnected (i.e., directly or indirectly) to each other, and in turn one or both of such nodes in turn may be each connected to one or more additional nodes via one or more fiber optic segments. Herein, transient resilient transmissions are transmissions in which one or more potential adverse impacts to optical network transmission performance, that may otherwise result from one or more optical network transient events, is reduced or eliminated in the optical network.

Optical network transient events may be caused by any one or more of a variety of circumstances, including for example and without limitation one or more relatively sudden, momentary, and/or unmitigated interruptions of at least one fiber optic segment of the optical network. For example, a transient event may be caused by a connection path interruption (e.g., cutoff), wherein one of the fiber optic segments (e.g., path segments) or one of the additional interconnected nodes may become disconnected from the optical network. A transient event also may be caused by for example a power connection surge, wherein power transmitted from one of the interconnected nodes may meaningfully increase for example in an unmitigated manner. An uncontrolled turn up of multiple new optical channels, or a rerouting of multiple existing optical channels, for instance can also cause a transient event, for example to the extent that a relatively sudden, meaningful increase in the number of optical channels on a given link causes the pre-existing (i.e., pre-existing, from the perspective of the onset of the transient event) optical channels already present on the link to experience a resulting drop in optical power.

In one or more example embodiments, a system and method described herein are configured to reduce a potential adverse impact to the optical network resulting from one or more transient events, by adaptively provisioning instructions for routing resources in the optical network. The optical network may route the one or more optical channels through a specific connection path based at least in part upon the provisioning instructions. The provisioning instructions may be determined based at least in part upon one or more service requests for transmitting the one or more optical channels between the two nodes and information relating to a configuration and capabilities of the one or more optical channels.

The system and method described herein for instance can be integrated into any one or more of multiple practical applications. For example, the system and the method may be integrated into a practical application of performing transient resilient transmissions of the one or more optical channels between two nodes in the optical network. Further, the system and method may be integrated into a practical application of performing transient resilient transmissions that are adapted to changes in the optical network and/or changes to the service request(s) requesting transmission of the optical channel(s). In particular, the provisioning instructions may be initialized and/or updated throughout network operation, which results in a more dynamic and flexible network. These practical applications may lead to a technical advantage of improved transmission resilience by adaptively reducing a potential adverse impact to the optical network resulting from one or more transient events. In these resilient transmissions, power and data integrity may be increased in the transmitted optical channel(s) by at least meaningfully reducing, if not altogether minimizing or preventing, a potential adverse impact to the optical network resulting from one or more transient events.

In some example embodiments, the system and method may also provide a technical solution of managing and adapting the provisioning instructions based at least in part upon ongoing changes in the optical network. Another technical solution may be to increase the efficiency with which network resources are consumed by significantly reducing risk of adverse impact to optical channel transmissions in the optical network resulting from one or more transient events.

In one or more example embodiments, the system includes an apparatus, such as a path computation element, that is communicatively coupled to multiple nodes in the optical network. The apparatus may include one or more processors configured to implement an optical performance engine that is configured to receive at least one service request to transmit one or more optical channels from a first node to a second node in the optical network. In conjunction with the optical performance engine, one or more processors may be configured to determine, based at least in part upon the service request, a plurality of proposed connection paths to transmit at least a first optical channel from the first node to the second node. The optical performance engine for example may be further configured to generate, based at least in part upon the service request(s), a channel risk map indicating a respective channel risk level for each respective optical channel of the at least a first optical channel (i.e., a channel risk level for the first optical channel, and an additional respective channel risk level for each of the other respective optical channels if the at least a first optical channel comprises more than one optical channel).

In certain example embodiments, one or more processors implement a transient analysis engine that is communicatively coupled to the optical performance engine. In conjunction with the transient analysis engine, one or more processors may be configured to receive the channel risk map and determine a first transient risk level in a first connection path of the proposed connection paths and a second transient risk level in a second connection path of the proposed connection paths, based at least in part upon the channel risk map. One or more processors may be configured to generate a failure state analysis result based at least in part upon the first transient risk level and the second transient risk level.

In certain example embodiments, one or more processors implement a network performance engine that is communicatively coupled to the optical performance engine and the transient analysis engine. In conjunction with network performance operations, one or more processors may be configured to receive the failure state analysis result, a transmission cost rule, and a transmission performance rule, and to determine, based at least in part upon the failure state analysis result, whether any one or more path segments in the first connection path contributes to at least one transmission performance risk (for example, but without limitation, potential transient-related channel failure) presented by a given one or more optical network transient events. In the present example embodiment, such determination includes an identification of such path segment(s) of the first connection path. One or more processors may be configured to determine, based at least in part upon the failure state analysis result, whether any path segment in the second connection path contributes to at least one transmission performance risk presented by the given one or more optical network transient events. In the present example embodiment, such determination includes an identification of such path segment(s) of the second connection path. One or more processors may be configured to generate multiple transient proofness thresholds based at least in part upon the transmission cost rule, the transmission performance rule, the determination of any path segment in the first connection path that contributes to at least one transmission performance risk presented by the one or more optical network transient events, and the determination of any path segment in the second connection path that contributes to at least one transmission performance risk presented by the one or more optical network transient events. Each transient proofness threshold of the transient proofness thresholds may be associated with a corresponding path segment of the proposed connection paths. Alternatively in another version of this example embodiment, each transient proofness threshold of the transient proofness thresholds instead may be more generally associated with a corresponding one of the proposed connection paths.

In certain example embodiments, one or more processors implement a routing and spectrum assignment engine that is communicatively coupled to the optical performance engine, the transient analysis engine, and the network performance engine. In conjunction with the routing and spectrum assignment engine, one or more processors may be configured to receive the transient proofness thresholds and a base provisioning policy. The base provisioning policy may include a first base cost for first multiple path segments corresponding to the first connection path and a second base cost for second multiple path segments corresponding to the second connection path. One or more processors may be configured to modify, into a modified first base cost, the first base cost in view of a first transient proofness threshold, such as for example a first transient proofness threshold corresponding to a first path segment in the first connection path. One or more processors may be configured to modify, into a modified second base cost, the second base cost by a second transient proofness threshold corresponding to a second path segment in the second connection path.

The foregoing summary is intended to provide a brief overview of certain subject matter described in this document, including select attributes of example embodiments of the present invention. Accordingly, it will be appreciated that the above-described features are non-limiting examples and should not be construed to narrow the scope or spirit of the subject matter described herein in any way. Other features, aspects, and advantages of the subject matter described herein will become apparent from the following disclosure, including without limitation the figures and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

FIGS. 4A and 4B illustrate an example flowchart of a method for providing transient resilient transmissions in accordance with one or more example embodiments;

DETAILED DESCRIPTION

The inventors of the present invention have observed that optical network events, such as for example optical network disruptions, optical network changes, optical fiber interruptions (e.g., breaks, cuts, disconnections, etc.), and/or other circumstances, may introduce transients (e.g., momentary variations in power over frequency) into an optical network. Due to the dynamic response of optical amplifiers varying input spectrum profile, such transients (resulting from one or more transient events) may be amplified through network components (e.g., nodes) in the optical network. As a result, resources transmitted in optical channels via nodes that are directly or indirectly connected in the path of the optical fiber may be adversely impacted by the transient events. These adverse impacts may comprise for example and without limitation an adversely affected power level or a timing of one or more of the optical channels, which in turn may cause transmission performance degradation and possibly traffic loss of any spectral resources assigned to the optical channels.

In one or more example embodiments, a system and method may be configured to reduce a potential adverse impact to the optical network resulting from one or more transient events, by adaptively provisioning instructions for routing resources in the optical network. In one or more example embodiments, a system and method selectively bias the optical channel provisioning process to preferentially select optical network configurations leading to improved transient resilience of the optical network as a whole. The optical network may route the one or more optical channels through a specific connection path based at least in part upon the provisioning instructions. The provisioning instructions may be determined based at least in part upon one or more service requests for transmitting resources in the one or more optical channels between the two nodes and information relating to a configuration and capabilities of the one or more optical channels. In this regard, the system and method may perform an analysis of the optical network and any possible impact of transients to the optical channels before transmitting the provisioning instructions.

Previous technologies fail to provide efficient and reliable solutions to improve the resilience of optical channel transmissions in response to disruptions or other changes to an optical network presented by transient events. Example embodiments of the present disclosure and its advantages may be understood by referring to FIGS. 1-6.

Optical Network

Figure 1:
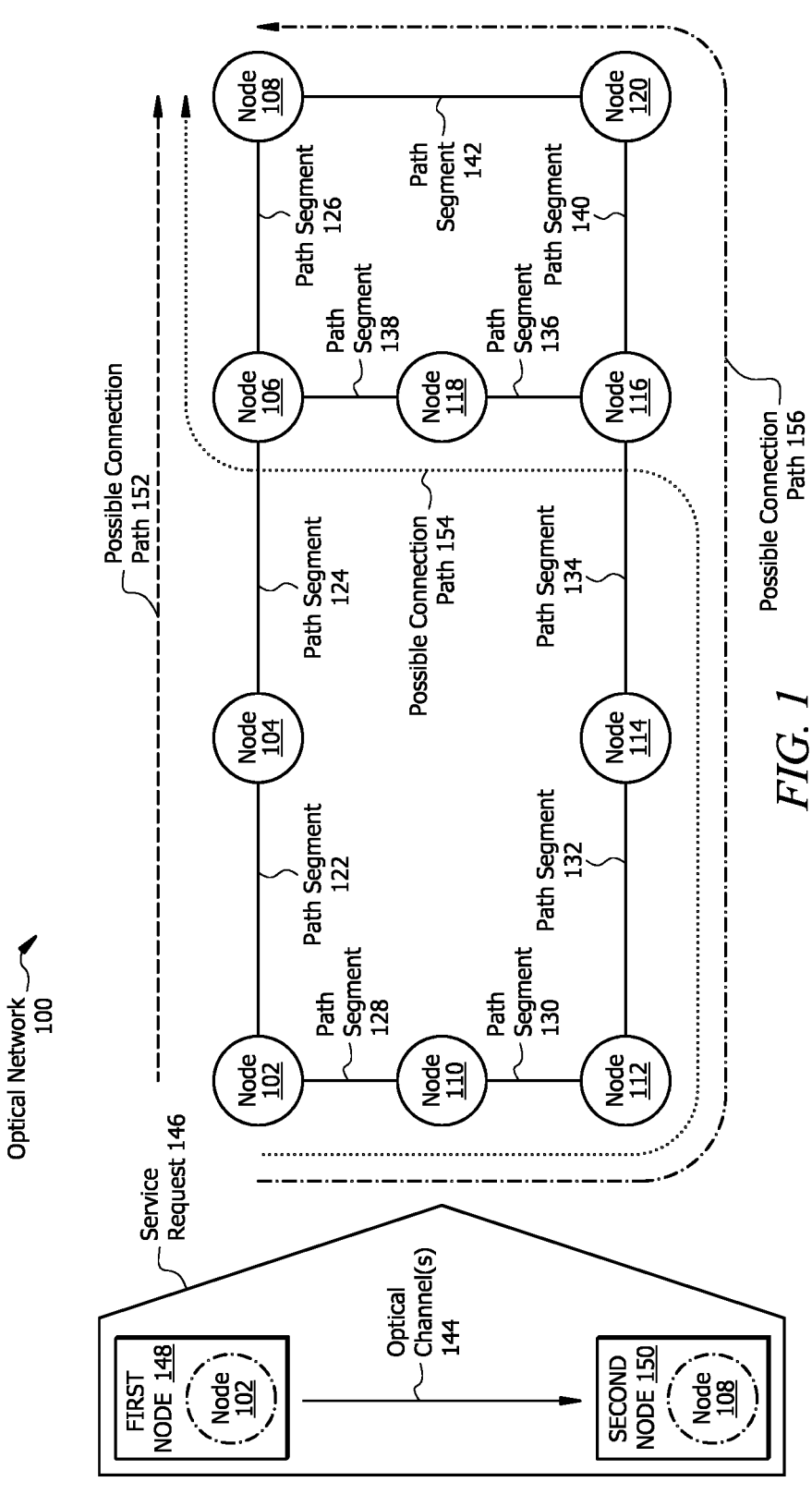
FIG. 1 illustrates an example optical network in accordance with one or more example embodiments.

FIG. 1 illustrates an optical network 100 in accordance with one or more example embodiments. In the optical network 100, multiple nodes 102-120 may be interconnected (e.g., linked) via fiber optics segments (e.g., hereinafter referred to as connection path segments or path segments 122-142). The nodes 102-120 may be Reconfigurable Optical Add/Drop Multiplexer (ROADM) or any other network component. The path segments 122-142 may be sections of an optical fiber link, or any other carrier adapted to transport optical signals back and forth among the nodes 122-142. The optical network 100 may be configured to transfer information in the form of optical signals between the nodes 102-120 via the path segments 122-142 using an optical transmission format or standard, such as for example Quadrature Phase-Shift Keying (QPSK), Quadrature Amplitude Modulation (8-QAM) or 16-QAM, and the assigned bandwidth. In accordance with the optical transmission format, multiple optical channels 144 may be established between one or more of the nodes 102-120. In some example embodiments, wavelengths or frequency resources may be assigned to any of these optical channels 144. For instance, the resources assigned for each optical channel 144 may correspond to at least one wavelength interval or at least one frequency interval per optical channel 144. Hereinafter, to transmit optical channels 144 may refer to transmitting resources in one or more optical channels between any two nodes.

In one or more example embodiments, a service request 146 indicates that the optical channels 144 may be transmitted from a first node 148 to a second node 150. The optical channels 144 may follow a connection path from the first node 148 to the second node 150. In some example embodiments, the connection path is a routing path selected to meet one or more connectivity parameters indicated in the service request 146. In the example of FIG. 1, the service request 146 is shown as an input provided to the optical network 100. The first node 148, the second node 150, and the optical channels 144 may be indicated in the service request 146. In the service request of FIG. 1, the first node 148 may be the node 102 and the second node 150 may be the node 108. In some example embodiments, the optical channels 144 may be transmitted via one of many multiple connection paths. For example, a first connection path 152 may include transmitting the optical channels 144 from the node 102 (e.g., acting as the first node 148) to the node 104 via the path segment 122, from the node 104 to the node 106 via the path segment 124, and from the node 106 to the node 108 (e.g., acting as the second node 150) via the path segment 126. In another example, a second connection path 154 may include transmitting the optical channels 144 from the node 102 (e.g., acting as the first node 148) to the node 110 via the path segment 128, from the node 110 to the node 112 via the path segment 130, from the node 112 to the node 114 via the path segment 132, from the node 114 to the node 116 via the path segment 134, from the node 116 to the node 118 via the path segment 136, from the node 118 to the node 106 via the path segment 138, and from the node 106 to the node 108 (e.g., acting as the first node 148) via the path segment 126. In yet another example, a third connection path 156 may include transmitting the optical channels 144 from the node 102 (e.g., acting as the first node 148) to the node 110 via the path segment 128, from the node 110 to the node 112 via the path segment 130, from the node 112 to the node 114 via the path segment 132, from the node 114 to the node 116 via the path segment 134, from the node 116 to the node 120 via the path segment 140, and from the node 120 to the node 108 (e.g., acting as the first node 148) via the path segment 142.

In one or more example embodiments, the optical network 100 may not have all of the components listed and/or may have other elements instead of, or in addition to, those listed above. In some example embodiments, there may be a number "K" of possible connection paths between the first node 148 and the second node 150. In the example of FIG. 1, the number K may be equal to 3 (e.g., K=3) to indicate that the number of possible connection paths 152-156 between the node 102 and the node 108 equals three.

Optical Communication System Overview

Figure 2:
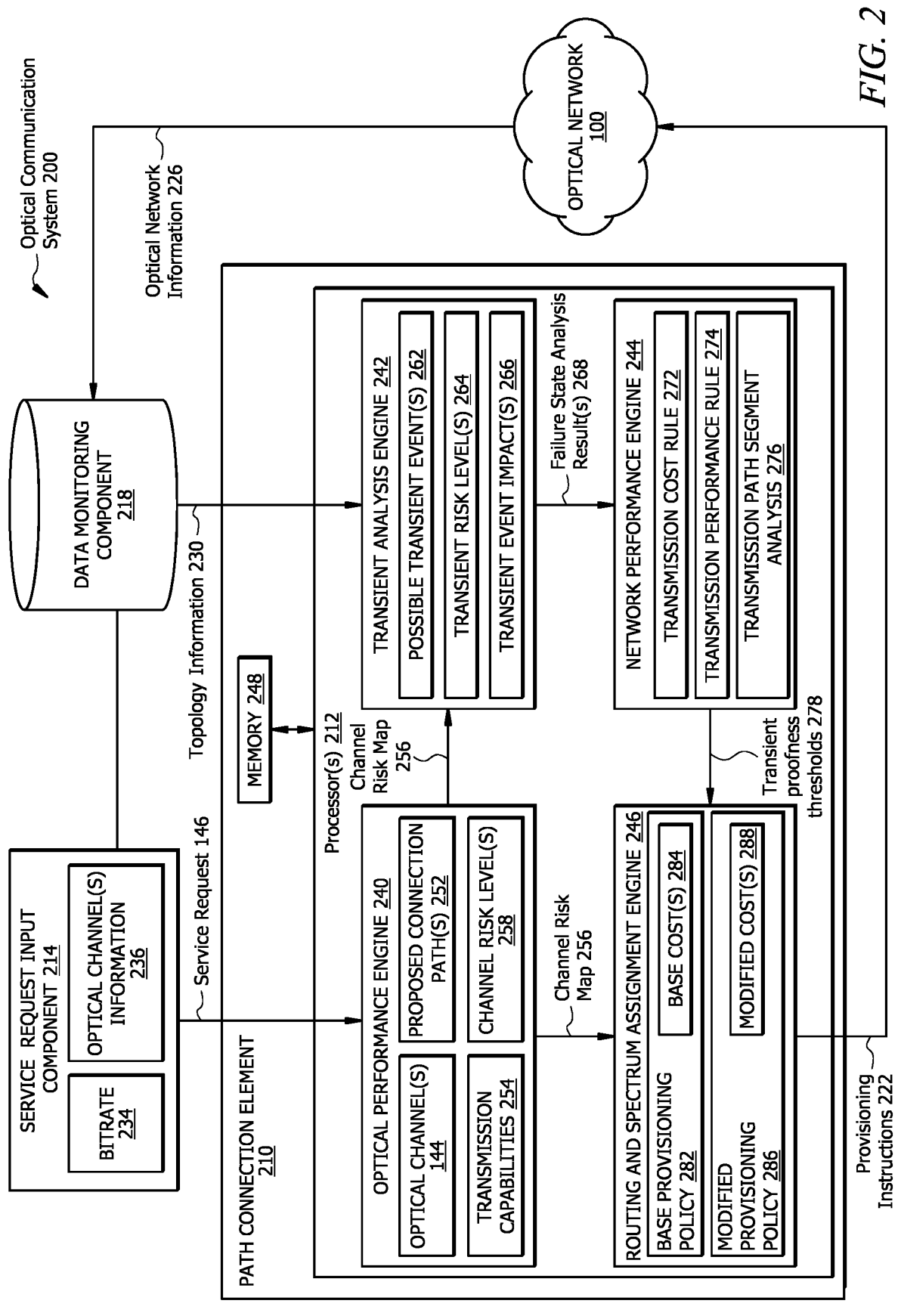
FIG. 2 illustrates an example system configured to provide transient resilient transmissions in an example optical network in accordance with one or more example embodiments.

FIG. 2 illustrates an optical communication system 200 in accordance with one or more example embodiments. In the optical communication system 200, a Path Computation Element (PCE) 210 may be configured to perform transient resilient transmissions of resources in one or more optical channels 144 between any two nodes interconnected (e.g., linked) out of the nodes 102-120 via fiber optics segments (e.g., connection path segments or path segments 122-142) in the optical network 100. Examples of the nodes 102-120 and the path segments 122-142 are shown in FIG. 1.

FIG. 2 schematically shows the PCE 210 communicatively coupled to a service request input component 214, the optical network 100, and a data monitoring component 218, in accordance with one or more example embodiments. For example, the PCE 210 is shown as receiving a service request 146 from the service request input component 214. In response to receiving the service request 146, the PCE 210 may generate multiple provisioning instructions 222. For example, the PCE 210 may communicate the provisioning instructions 222 to the optical network 100 to route one or more optical channels 144 through a specific connection path. The provisioning instructions 222 are discussed in more detail in reference to FIG. 3. The optical network 100 may transmit optical network information 226 to the data monitoring component 218. The optical network information 226 may indicate, among other things, any internal changes in the topology of the optical network 100. In turn, the data monitoring component 218 may share updated topology information 230, that includes any such changes in topology, to the PCE 210. The service request input component 214, the PCE 210, and their corresponding signaling are described in detail below.

Optical Communication System Components

Service Request Input Component

In some example embodiments, the optical network 100 is configured to provide connectivity between at least a given two nodes in the form of a service set up between nodes. In the optical communication system 200 of FIG. 2, the service request input component 214 may provide the PCE 210 with the service request 146 to request connectivity between two specific nodes (e.g., the first node 148 and the second node 150). In one or more example embodiments, the PCE 210 comprises one or more processors 212 configured to perform one or more provisioning operations, one or more signal analyses, and one or more configuration assignments. The service request input component 214 may be a device or a system configured to request a transient resilient transmission of resources in optical channels 144 between two nodes in the optical network 100. The service request input component 214 may be part of the optical network 100 or separate network devices or network systems communicatively coupled to the optical network 100 via the PCE 210. For example, in the service request 146, the service request input component 214 may request to transmit multiple optical channels 144 from the first node 148 to the second node 150 in the optical network 100 as described in reference to FIG. 1. The service request 146 may specify a bitrate 234 (e.g., line rate) and optical channels information 236 to transmit these optical channels 144.

In some example embodiments, the bitrate 234 is a predetermined (e.g., preconfigured) rate of bits per second in which the optical channels 144 are requested to be transmitted. The bitrate 234 may indicate a threshold value or a threshold range that the optical channels 144 are requested to meet during transmissions. In one example, the bitrate 234 in the service request 146 may indicate that a transmission of the optical channels 144 is equal to or greater than a threshold value of 200,000,000,000 bits per second. In another example, the bitrate 234 in the service request 146 may indicate that the transmission of the optical channels 144 is within a threshold range of 100,000,000,000 and 400,000,000,000 bits per second, inclusive.

In some example embodiments, the optical channels information 236 identifies the first node 148 and the second node 150 of the transmission. In the optical network 100, the first node 148 and the second node 150 may be directly or indirectly interconnected to one another via one or more path segments (e.g., the node 102 and the node 104 connected via the path segment 122) or via a combination of multiple path segments and additional nodes (e.g., the node 102 and the node 108 connected via multiple path segments 122-126 and additional nodes 104-106 in the connection path 152). Further, the optical channels information 236 may indicate a power level for the optical channels 144 in the transmission.

Path Computation Element

In the example of FIG. 2, the service request 146 may be received by the PCE 210. For example, the PCE 210 may determine a transient resilient connection path (e.g., one of connection paths 152-156) between the first node 148 and the second node 150 in accordance with the bitrate 234 and the optical channel information 236 indicated by the service request 146. The connection path may include one or more intermediate nodes (e.g., additional nodes such as any one or more of the nodes 104, 106, and 110-120 in the example of FIG. 1) formed by additional ROADMs or other network elements. The PCE 210 may specify for the connection path to include specific wavelengths used in specific path segments (e.g., such as one or more of the path segments 122-142 in the example of FIG. 1) across the additional nodes between the first node 148 and the second node 150. In some example embodiments, to fulfill the service request 146 in the transient resilient transmission, the PCE 210 may specify for the connection path to include signal conversions from the optical domain to the electrical domain and from the electrical domain to the optical domain.

In the optical communication system 200 of FIG. 2, the PCE 210 comprises the one or more processors 212 and a memory 248 communicatively coupled to one another. The one or more processors 212 may be configured to implement an optical performance engine 240, a transient analysis engine 242, a network performance engine 244, and a routing and spectrum assignment engine 246 communicatively coupled to one another and configured to exchange control and/or communication signals. In some example embodiments, the PCE 210 may compute possible optical channels 144 used to support the service request 146 received from the service request input component 214 and to find an end-to-end provisioning solution transmitting optical channels 144. The memory 248 may be a storage medium in which preconfigured information or parameters associated with transmissions in the optical network 100 are stored.

Optical Performance Engine

In the example of FIG. 2, in conjunction with the optical performance engine 240, the one or more processors 212 may be configured to receive the service request 146 from the service request input component 214. As described above, the service request 146 may be a request for service to transmit multiple optical channels 144 at the bitrate 234 between a particular first node 148 and a particular second node 150 in the optical network 100. For example, upon receiving the service request 146, in the optical performance engine 240, the one or more processors 212 may evaluate proposed connection paths 252 for transmission of the optical channels 144 in the optical network 100. For example, in the optical performance engine 240, the one or more processors 212 may provide visibility over existing proposed connection paths 252 to deploy the optical channels 144.

In one or more example embodiments, in the optical performance engine 240, the one or more processors 212 may evaluate, based at least in part upon the service request 146, multiple transmission capabilities 254 of the optical network 100. The transmission capabilities 254 may include wavelength capability information, bitrate capability information, and the topology information 230 of the optical network 100. In some example embodiments, the transmission capabilities 254 may be predefined or preconfigured in the memory 248 before the service request 146 is received. In other example embodiments, the transmission capabilities 254 may be dynamically updated and received at the optical performance engine 240 in conjunction with receiving the service request 146.

The wavelength capability information of the capabilities 254 may indicate multiple wavelength transmission capabilities for the first node 148, the second node 150, and any intermediate additional nodes in the optical network 100. The wavelength transmission capabilities may include one or more wavelength transmission ranges that may be handled by any of the nodes. In one example, the wavelength transmission capabilities may indicate that the first node 148 may be configured to transmit optical channels 144 within a wavelength range between 1530 nanometers and 1565 nanometers, inclusive. In another example, the wavelength transmission capabilities may indicate that the second node 150 may be configured to receive optical channels 144 in a wavelength range equal to or greater than 1550 nanometers.

The bitrate capability information of the transmission capabilities 254 may indicate multiple bitrate transmission capabilities for the first node 148, the second node 150, and any intermediate additional nodes in the optical network 100. For example, the bitrate transmission capabilities may include one or more bitrate transmission ranges that may be handled by any of the nodes. In one example, the bitrate transmission capabilities may indicate that the first node 148 may be configured to transmit optical channels 144 within a bitrate range between 200 Gigabits per second (Gb/s) nanometers and 800 Gb/s, inclusive. In another example, the bitrate transmission capabilities may indicate that the second node may be configured to receive optical channels 144 in a bitrate range equal to or greater than 400 Gb/s.

In some example embodiments, the bitrate transmission capability may be indicated by a number followed by the letter "G." In this regard, a bitrate transmission capability of 600 G is understood to be a bitrate transmission capability of 600 Gb/s.

The topology information 230 may represent interconnections between the first node 148, the second node, and any intermediate additional nodes in the optical network 100. For example, the topology information 230 may include interconnections of each node in the optical network 100. In one example, the topology information 230 may indicate that the optical network 100 includes nine nodes. Further, the topology information 230 may indicate a number of nodes connected to the first node 148 or the second node 150.

In one or more example embodiments, the transmission capabilities 254 comprise information relating to wavelength capability information, bitrate capability information, and/or topology information 230 of fiber optic cable creating the path segments connecting any two nodes in the optical network 100.

In one or more example embodiments, the optical performance engine 240 may be configured to generate, based at least in part upon the bitrate 234 and the transmission capabilities 254 of the optical network 100, a channel risk map 256 for the proposed connection paths 252. For example, the channel risk map 256 indicates channel risk levels 258 for the optical channels 144 indicated in the service request 146. The channel risk levels 258 may represent a risk of failure of a corresponding optical channel 144 in response to possible optical network transient events. The channel risk map 256 may identify channels at risk of failure or degraded performance in the connection paths 126 (e.g., which may be affected not by the failure itself, but by the optical network 100 response to the failure). In other example embodiments, the optical performance engine 240, the one or more processors 212 may be further configured to generate, based at least in part upon the bitrate 234 and the transmission capabilities 254 of the optical network 100, multiple proposed connection paths 252 to transmit the optical channels 144 from the first node 148 to the second node 150.

Transient Analysis Engine

In the example of FIG. 2, the transient analysis engine 242 may be communicatively coupled to the optical performance engine 240, the data monitoring component 218, and the network performance engine 244. In the transient analysis engine 242, the one or more processors 212 may receive the channel risk map 256 from the optical performance engine 240 and the topology information 230 from the data monitoring component 218. In the transient analysis engine 242, the one or more processors 212 may be configured to analyze the impact of possible optical network transient events (e.g., possible transient events 262) in the proposed connection paths 252 based at least in part upon the channel risk map 256 and the topology information 230.

In one or more example embodiments, the transient analysis engine 242 determines transient risk levels 264 and transient event impacts 266 for multiple connection paths out of the proposed connection paths 252 indicated in the channel risk map 256. Using the optical network 100 of FIG. 1 as an example, the proposed connection paths may be connection paths 152-156. Each transient risk level 264 indicates a possibility of one or more possible transient events 262 in a corresponding connection path. In the optical network 100 of FIG. 1, each one of the connection paths 152-156 may receive a corresponding transient risk level 264. The transient analysis engine 242 evaluates a likelihood of an optical network transient event in each of the proposed connection paths 252 by considering a location and/or a traffic of each path segment in a given connection path. For example, in the optical network 100 of FIG. 1, the transient analysis engine 242 may identify that the path segment 124 connecting two intermediate additional nodes 104 and 106 in the connection path 152 is at a higher risk of an optical network transient event if the path segment is located near a construction zone (e.g., fiber optic cables may be inadvertently cut by construction equipment). In another example, the transient analysis engine 242 may identify that the path segment 128 connecting the node 102 acting as the first node 148 to one intermediate additional node 110 in the connection paths 154 and 156 is at a lower risk of an optical network transient event if the path segment is located in a protective enclosure (e.g., fiber optic cables may be guarded in a communications enclosure rated for hazardous locations that may not be affected by unintended strikes).

Each transient event impact 266 indicates a possible impact of one or more possible transient events 262 in a corresponding connection path. The transient analysis engine 242 evaluates an impact of an optical network transient event in each of the connection paths by considering existing transient resilience of each path segment in a given connection path. For example, the transient analysis engine 242 may determine that an optical network transient event in a path segment connecting two intermediate additional nodes may have a higher impact in the transmission of the optical channels 144 if the path segment is considered to currently have poor transient resilience. In another example, the transient analysis engine 242 may determine that an optical network transient event in a path segment connecting the first node 148 to one intermediate additional node may have a lower impact in the transmission of the optical channels 144 if the path segment is considered to currently have adequate transient resilience.

In one or more example embodiments, the impact of a transient event is a possible distortion or degradation of the optical channels 144 during transmission. In this regard, a higher impact indicates a higher degradation of the optical channels 144 (e.g., the optical channels 144 may be lost in the event of an optical network transient event) while a lower impact indicates a lower degradation of the optical channels 144 (e.g., the optical channels 144 may survive in the event of an optical network transient event). In some example embodiments, transient resilience may be determined based at least in part upon a number of safeguards currently included in the path segment. Some safeguards may include adding noise margins to transmissions in the path segment or anchoring nodes in the path segment.

In some example embodiments, in the transient analysis engine 242, the one or more processors 212 determines transient risk levels 264 and transient event impacts 266 based at least in part upon the channel risk map 256. In other example embodiments, in the transient analysis engine 242, the one or more processors 212 determines transient risk levels 264 and transient event impacts 266 based at least in part upon the channel risk map 256 and updates the topology information 230. The topology information 230 may be current topology information of the optical network 100. The topology information 230 may be updated topology information indicating changes made to the optical network 100 within a predetermined period of time or since a last time when the service request 146 was received. The optical network 100 may transmit the optical network information 165 to the data monitoring component 218. In turn, the data monitoring component 218 may determine recent changes to the optical network 100 before transmitting the topology information 230 to the transient analysis engine 242.

Upon considering the channel risk map 256 from the optical performance engine 240 and the topology information 230 from the data monitoring component 218, in the transient analysis engine 242, the one or more processors 212 may generate a failure state analysis result 268. The failure state analysis result 268 may include an impact of possible transient events 262 in each path segment in the connection paths evaluated from the proposed connection paths 252.

Network Performance Engine

In the example of FIG. 2, the network performance engine 244 may be communicatively coupled to the transient analysis engine 242 and the routing and spectrum assignment engine 246. In the network performance operations 244, the one or more processors 212 may be configured to receive the failure state analysis result 268. Further, in the network performance engine 244, the one or more processors 212 may be configured to receive a transmission cost rule 272 and a transmission performance rule 274 from the memory 248 or another storage device. For example, upon receiving the failure state analysis result 268, the transmission cost rule 272, and the transmission performance rule 274, the network performance engine 244 may be configured to perform a transmission path segment analysis 276. In the transmission path segment analysis 276, the network performance engine 244 may determine whether any path segment in one of the evaluated connection paths in the optical network 100 contributes to one or more possible transient events 262.

In some example embodiments, the transmission cost rule 272 indicates guidelines associated with a funding cost of transmissions. The transmission cost rule 272 may indicate a budget allotted for the transient resilient transmission of the optical channels 144. The budget may be a predetermined value amount or a predetermined range value amount. For example, the funding cost may be indicated to be equal to or less than 10,000 Euros. In some example embodiments, the transmission cost rule 272 indicates a non-linear change of a budget over time. For example, the funding cost may be indicated via a non-linear equation that changes based at least in part upon a time of the year or a quarterly project allowance.

In some example embodiments, the transmission performance rule 274 indicates guidelines associated with estimated reliability corresponding to each of the evaluated connection paths. The transmission performance rule 274 may be a value representing an acceptable failure probability threshold of a connection path selected for the transmission of the optical channels 144. The acceptable failure probability threshold of the connection path may be provided based at least in part upon the elements involved in transmitting the optical channels 144 from the first node 148 to the second node 150 (e.g., path segment location structures such as the location of fiber optic cables).

In one or more example embodiments, the network performance engine 244 may be configured to generate multiple transient proofness thresholds 278 based at least in part upon the transmission cost rule 272, the transmission performance rule 274, and the determination of any path segment in the evaluated connection paths in the optical network 100 that contributes to the one or more possible transient events 262. Each of the transient proofness thresholds 278 may be associated with a corresponding path segment of the evaluated connection paths. The transient proofness thresholds 278 may be numerical values that increase, subtract, or maintain cost from an existing cost (e.g., base cost or baseline cost) of corresponding path segments. Each transient proofness threshold 278 may correspond to each individual path segment between two nodes.

Routing and Spectrum Assignment Engine

In one or more example embodiments, the routing and spectrum assignment engine 246 may be communicatively coupled to the network performance engine 244 and configured to receive the transient proofness thresholds 278. In some example embodiments, in the routing and spectrum assignment engine 246, the one or more processors 212 may be communicatively coupled to the optical performance engine 240 and configured to receive the channel risk map 256. In some example embodiments, in the routing and spectrum assignment engine 246, the one or more processors 212 may be configured to receive a base provisioning policy 282 from the memory 248 or storage device and generate a modified provisioning policy 286. In the routing and spectrum assignment engine 246, the one or more processors 212 may include a routing and spectrum controller configured to select a more efficient provisioning policy to fulfill the service request 146. The more effective provisioning policy may include selecting one of the evaluated connection paths and specific wavelengths/spectrum for each optical channel 144. In some example embodiments, in the routing and spectrum assignment engine 246, the one or more processors 212 may generate the provisioning instructions 222 for the optical network 100 based at least in part upon the channel risk map 256 received from the optical performance engine 240 and the transient proofness thresholds 278 received from the network performance engine 244.

The base provisioning policy 282 may include base costs 284 for path segments corresponding to each of the evaluated connection paths. The base costs 284 may be an existing cost to transmit the optical channels 144 over individual path segments in each of the evaluated connection paths.

The modified provisioning policy 286 may include modified versions of the base costs 284. The modified versions of the base costs 284 may be a new cost (e.g., modified costs 288) to transmit the optical channels 144 over individual path segments in each of the evaluated connection paths. For example, a modified first base cost 288 may be a first base cost 284 that is modified by a first transient proofness threshold 278 corresponding to a first path segment (e.g., one of path segments 122-142 in FIG. 1) in a first connection path (e.g., one of connection paths 152-156 in FIG. 1) of the evaluated connection paths. Further, a modified second base cost 288 may be a second base cost 284 that is modified by a second transient proofness threshold 278 corresponding to a second path segment (e.g., another one of path segments 122-142 in FIG. 1) in a second connection path (e.g., another one of connection paths 152-156 in FIG. 1) of the evaluated connection paths. As described above, the first transient proofness threshold 278 may indicate a first increase or a first decrease to the first base cost corresponding to the first path segment in the first connection path. Similarly, the second transient proofness threshold 278 indicates a second increase or a second decrease to the second base cost corresponding to the second path segment in the second connection path.

The routing and spectrum controller may be hardware configured to select routing directions for a connection path out of the evaluated connection paths. The spectrum and spectrum controller may be hardware configured to allocate spectral resources for a connection path out of the evaluated connection paths. The routing cand spectrum controller may be configured to select one of the evaluated paths to provision the optical channels 144 for the transient resilient transmission. For example, the routing and spectrum controller may compare the modified first base cost to the modified second base cost. Then, the routing and spectrum controller may determine the higher of the modified first base cost or the modified second base cost. At this stage, in response to determining that the modified first base cost is higher than the modified second base cost, the routing and spectrum controller may select the modified second base cost. Alternatively, in response to determining that the modified second base cost is higher than the modified first base cost, the routing and spectrum controller may select the modified first base cost. In either case, in response to selecting one of the modified base costs, the routing and spectrum assignment engine 246 may generate the provisioning instructions 222 to transmit the optical channels 144 indicated by the service request 146 from the first node 148 to the second node 150 using the selected connection path.

Figure 3:
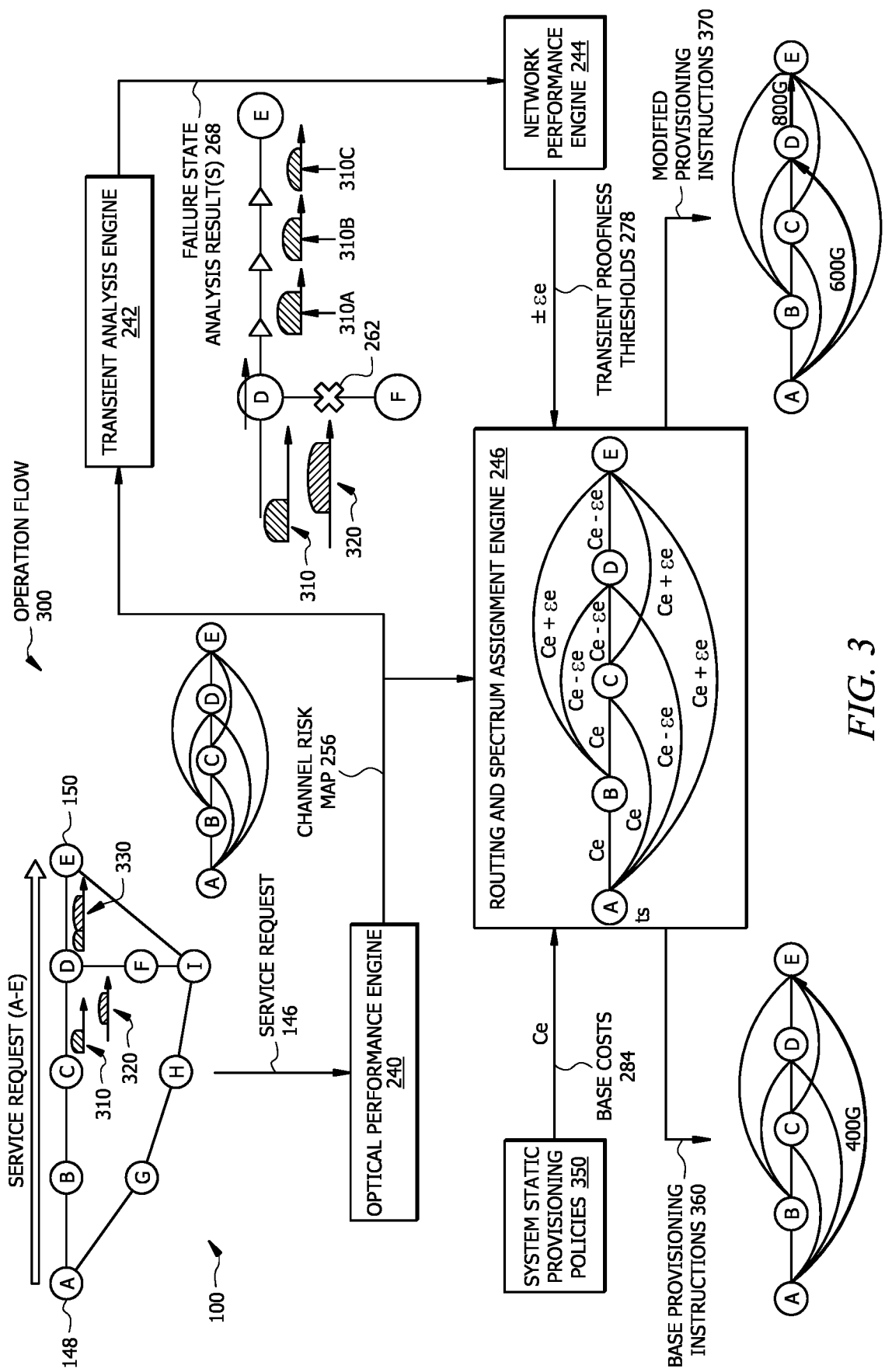
FIG. 3 illustrates, in block diagram form, an example operational flow of the system of FIG. 2 in accordance with one or more example embodiments.

As described above, a detailed example of generating provisioning instructions 222 is described in FIG. 3. In one or more example embodiments, the provisioning instructions 222 are instructions to increase transient resilience in at least one path segment in the connection path selected to transmit the optical channels 144. As described above, transient resilience may be determined based at least in part upon a number of safeguards included in the path segment. Some safeguards may include adding noise margins to transmissions in the path segment or anchoring nodes in the path segment. In this regard, in some example embodiments, the provisioning instructions 222 may be instructions to route the optical channels 144 via a path segment of the optical network 100 that includes one of these safeguards. In other example embodiments, the provisioning instructions 222 may be instructions to add one of these safeguards to a portion of the optical network 100.

Operational Flow of Transient Resilient
Transmissions

FIG. 3 illustrates an example of an operational flow 300 of the optical communication system 200 described in reference to FIG. 2 in accordance with one or more example embodiments. The operational flow 300 may incorporate the optical performance engine 240, the transient analysis engine 242, the network performance engine 244, and the routing and spectrum assignment engine 246 of FIG. 2.

In one or more example embodiments, the operational flow 300 illustrates a process in which an apparatus such as the PCE 210, selectively biases an optical channel provisioning process. In one example, FIG. 3 shows a biasing of the routing and spectrum assignment to preferentially select configurations leading to improved transient proofness transmissions in the optical network 100 as a whole. These configurations may apply to either current or future network states. As described above, the service request 146 to an optical network management system or a network controller may go through the PCE 210, which may determine possible optical channels 144 used to support the service request 146 (both new and existing) and find an end-to-end provisioning solution that uses one or more of the optical channels 144.

Within the PCE 210, the optical performance engine 240 may provide visibility over which connections are possible to deploy from an optical performance perspective. In some example embodiments, this is used by the routing and spectrum assignment engine 246 to assess the provisioning possibilities for deploying new optical channels 144 for the new service request 146. In conjunction, the transient analysis engine 242 may continuously analyze the impact of potential failures in the optical channels 144 (e.g., fiber cuts, breaks, disconnections, etc.). The result of the analysis in the optical performance engine 240 may be the channel risk map 256, which identifies optical channels 144 at risk of failure or degraded performance in the event of a network transient (e.g., which are affected not by the failure itself, but by the optical network response to the failure).

The network performance engine 244 may collect the different failure state analysis results 268, and identifies key network segments (e.g., path segments or nodes) contributing to potential transient-related failures in the optical channels 144. The network performance engine 244 may output a set of transient proofness threshold 278, which act as adaptive weight thresholds used in the provisioning policy to be provided by the routing and spectrum assignment engine 246. The routing and spectrum assignment engine 246 may select the more efficient provisioning policy for a given service, including selecting a routing path over the optical network 100, the set of existing/new optical channels 144 to use, and specific wavelengths/spectrum for each new optical channel. In accordance with the transient proofness threshold 278, the routing and spectrum assignment engine 246 may include to select provisioning solutions that lead to a more robust network behavior against possible transient events 262, while maintaining adequate cost/resource efficiency in the provisioning process.

Service Request

In one or more example embodiments, the operational flow 300 starts in conjunction with the optical performance engine 240 receiving the service request 146. In the example of FIG. 3, an example embodiment of the optical network 100 may include multiple nodes A-I interconnected via path segments (not labeled in FIG. 3, but similar to path segments 122-142 described in reference to FIG. 1). The nodes A-I include a node A connected to a node B and a node G; and a node E connected to a node D and a node I. In the example of FIG. 3, the node A, the node B, a node C, the node D, and the node E may be connected in sequence (e.g., each connected to the preceding node and the subsequent node). Further, the node A, the node G, a node H, a node I, and the node E may be connected in sequence. The node F may be connected to the node D and the node I.

The service request 146 may include a service request (A-E) to transmit the optical channels 144 from the node A (e.g., acting as the first node 148) to the node E (e.g., acting as the second node 150). In the example of FIG. 3, a first optical channel 310 is shown to meet a second optical channel 320 at the node D. An optical channel combination 330 of the first optical channel 310 and the second optical channel 320 is shown parallel to the path segment interconnecting the node D and the node E.

In this example, the first optical channel 310, the second optical channel 320, and the optical channel combination 330 may be existing transmissions to the node E. In some example embodiments, the first optical channel 310 may be one of the optical channels 144 selected for a transient resilient transmission in accordance with the service request (A-E). The service request (A-E) may specify the bitrate 234 (e.g., line rate) and the optical channels information 236 to transmit the optical channels 144.

Channel Risk Map

In conjunction with receiving the service request 146, the optical performance engine 240 may evaluate proposed connection paths 252 for transmission of the optical channels 144 in the optical network 100. In this regard, the optical performance engine 240 may provide visibility over existing proposed connection paths 252 to deploy the optical channels 144.

As described in reference to the example of FIG. 2, the optical performance engine 240 may evaluate, based at least in part upon the service request 146, multiple transmission capabilities 254 of the optical network 100. The optical performance engine 240 may provide a set of feasible optical channel deployments which can be interpreted as a graph of possible new connections (e.g., shown in the channel risk map 256). The PCE 210 may route over the graph to be made adhering to a specific provisioning policy that biases solutions to a specific objective.

The optical performance engine 240 may generate, based at least in part upon the bitrate 234 and the transmission capabilities 254 of the optical network 100, the channel risk map 256 for the proposed connection paths 252. The channel risk map 256 may indicate channel risk levels 258 for the optical channels 144 indicated in the service request 146. The channel risk map 256 may identify channels at risk of failure or degraded performance in the connection paths 126 (e.g., which may be affected not by the failure itself, but by the optical network 100 response to the failure). In other example embodiments, the optical performance engine 240 may generate, based at least in part upon the bitrate 234 and the transmission capabilities 254 of the optical network 100, multiple proposed connection paths 252 to transmit the optical channels 144 from the first node 148 to the second node 150.

In the example of FIG. 3, the channel risk map 256 shows the graph of possible connection paths. The possible connections include connections between the node A and the node B; the node A and the node C; the node A and the node D; and the node A and the node B. Other possible connections include connections between the node B and the node C; the node B and the node D; and the node B and the node E. Yet other possible connections include connections between the node C and the node D; and the node C and the node E. Another possible connection includes a connection between the node D and the node E. As shown in the embodiment of the optical network 100, the existing interconnections are the node A, the node B, the node C, the node D, and the node E in sequence. In the channel risk map 256, all other interconnections are new possible connections.

Failure State Analysis Result

In conjunction with receiving the channel risk map 256, the transient analysis engine 242 analyzes the impact of possible transient events 262 in the proposed connection paths 252 based at least in part upon the channel risk map 256 and topology information 230.

In the example of FIG. 3, the transient analysis engine 242 may determine transient risk levels 264 and transient event impacts 266 for multiple connection paths out of the proposed connection paths 252 indicated in the channel risk map 256. Each transient risk level 264 may indicate a possibility of one or more possible transient events 262 in a corresponding connection path. Each transient event impact 266 may indicate a possible impact of one or more possible transient events 262 in a corresponding connection path. The transient analysis engine 242 may evaluate an impact of an optical network transient event in each of the connection path by considering existing transient resilience of each path segment in a given connection path.

In the optical network 100 of FIG. 3, each one of the possible connection paths may receive a corresponding transient risk level 264. The transient analysis engine 242 may evaluate a likelihood of an optical network transient event in each of the proposed connection paths 252 by considering a location and/or a traffic of each path segment in a given connection path. For example, in the optical network 100 of FIG. 3, the transient analysis engine 242 may identify that the path segment connecting the intermediate additional nodes D and F is at a higher risk of an optical network transient event if the path segment is located near a construction zone (e.g., fiber optic cables may be invertedly cut by construction equipment).

In the event of the possible transient event 262, the first optical channel 310 may be lost. The loss may impact the transmission of the first channel via the node D. In accordance with one or more example embodiments, the transient analysis engine 242 may determine that the first optical channel 310 is expected to reach states 310A-310C where the first optical channel 310 is progressively lost before reaching the node E The impact of possible transient events 262 in each path segment in the connection paths evaluated from the proposed connection paths 252 are the basis to generate the failure state analysis result 268.

Transient Proofness Thresholds

In conjunction with receiving the failure state analysis results 268, in the network performance engine 244, the one or more processors 212 may perform the transmission path segment analysis 276. In the transmission path segment analysis 276, the network performance engine 244 may determine whether any path segment in one of the evaluated connection paths in the optical network 100 contributes to one or more of the possible transient events 262.

As described in reference to FIG. 2, in the network performance engine 244, the one or more processors 212 may be configured to generate multiple transient proofness thresholds 278 based at least in part upon the transmission cost rule 272, the transmission performance rule 274, and the determination of any path segment in the evaluated connection paths in the optical network 100 that contributes to the one or more possible transient events 262. Each of the transient proofness thresholds 278 may be associated with a corresponding path segment of the evaluated connection paths.

In the example of FIG. 3, the transient proofness thresholds 278 may be numeric values $\pm\varepsilon_e$ that that increase $+\varepsilon_e$ (e.g., $\varepsilon_e{>}0$), subtract $-\varepsilon_e$ (e.g., $\varepsilon_e{<}0$), or maintain cost (e.g., $\varepsilon_e{=}0$) from an existing cost (e.g., base cost 284) of corresponding path segments. The numeric values $\pm\varepsilon_e$ is for each individual edge and costs may not be the same for all path segments as a result. In the network performance engine 244, the one or more processors 212 may provide the transient proofness thresholds 278 to the routing and spectrum assignment engine 246. The numeric values $\pm\varepsilon_e$ transient proofness thresholds 278 may be different for each path segment in a connection path.

Base Routing Costs

In one or more example embodiments, system static provisioning policies 350 provide multiple base costs 284 to the routing and spectrum assignment engine 246. The system static provisioning policies 350 may be one or more cost policies (e.g., guidelines associated with a funding cost of transmission) affecting the first node 148, the second node 150, or another element in the optical network 100. As described in reference to FIG. 2, the base costs 284 may be for path segments corresponding to each of the evaluated connection paths. In the example of FIG. 3, the base costs 284 may be a numeric value $C_e$ representing an existing cost to transmit the optical channels 144 over individual path segments in each of the evaluated connection paths. The numeric value $C_e$ of the base costs 284 may be different for each path segment in a connection path.

Provisioning Instructions

In conjunction with receiving the channel risk map 256, the base costs 284, and the transient proofness thresholds 278, in the routing and spectrum assignment engine 246, the one or more processors 212 may select the more efficient provisioning policy to fulfill the service request 146. The more effective provisioning policy may include selecting one of the evaluated connection paths and specific wavelengths/spectrum for the first optical channel 310. In the Example of FIG. 3, the routing and spectrum assignment engine 246 generates the base provisioning instructions 360 or the modified provisioning instructions 370 for the optical network 100 based at least in part upon the channel risk map 256 received from the optical performance engine 240, the base costs 284 received from the system static provisioning policies 350, and the transient proofness thresholds 278 received from the network performance engine 244.

In the routing and spectrum assignment engine 246, the base costs 284 may be modified with information corresponding to the effect of transients on a particular connection path. In the Example of FIG. 3, the network performance engine 244 provides the transient proofness thresholds 278 in the form of adapted graph weights with numeric values $\cong\varepsilon_e$ to modify the base costs with numeric value $C_e$ in each path segment. In some example embodiments, given that the transient analysis engine 242 identified a failure in the path segment between the node F and the node D as a potential risk for the first optical channel 310, the adapted weights will try to bias the routing graph in order to force the routing and spectrum assignment engine 246 to select solutions that make the path segment between the node E and the node D less susceptible to failures in the path segment between the node F and the node D. In one or more example embodiments, a possible provisioning may comprise a smaller fraction of the total optical power in the path segment between the node E and the node D reliant on the connection path coming from the path segment between the node F and the node D. This approach may include decreasing the cost of transmissions that stop and depart at the node D coming from the node C (e.g., any optical channels which are locally added at the node D in route to the node E) or increasing the cost of transmissions that are transmitted through the path segments including the node C, the node D, and the node E in sequence (e.g., which may worsen an effect of a transient response).

In the example of FIG. 3, transmissions from the node A to the node B are determined to have a cost equal to the base cost $C_e$; transmissions from the node B to the node C are considered to have a cost equal to the base cost $C_e$; and transmissions from the node A to the node C are considered to have a cost equal to the base cost $C_e$. Further, transmissions from the node A to the node D are considered to have a cost equal to the modified cost $C_e{-}\varepsilon_e$; and transmissions from the node A to the node E are considered to have a cost equal to the modified cost $C_e{+}\varepsilon_e$. Additionally, transmissions from the node B to the node D are considered to have a cost equal to the modified cost $C_e{-}\varepsilon_e$; and transmissions from the node B to the node E are considered to have a cost equal to the modified cost $C_e{+}\varepsilon_e$. The transmissions from the node C to the node D may be considered to have a cost equal to the modified cost $C_e{-}\varepsilon_e$; and transmissions from the node C to the node E are considered to have a cost equal to the modified cost $C_e{+}\varepsilon_e$. Finally, the transmissions from the node D to the node E are considered to have a cost equal to the modified cost $C_e{-}\varepsilon_e$.

In one or more example embodiments, the more effective provisioning policy for the transient resilient transmission of the first optical channel 310 may include selecting a combination of transmissions that maintains or reduces overall base costs. In the example of FIG. 3, two possible provisioning instructions 222 are shown. In the base provisioning instructions 360, a lower-hop connection path employing an optical channel at a bitrate transmission capability of 400 G from the node A to the node E is provided. In the modified provisioning instructions 370, a connection path with two new path segments is provided. The modified provisioning instructions 370 may include an optical channel at a bitrate transmission capability of 600 G from the node A to the node D. Further, the modified provisioning instructions 370 may indicate for the path segment between the node D and the node E be anchored at a bitrate transmission capability of 800 G. For example, anchoring the node D and the node E may allow for transmissions between these nodes to have a more constant power. The constant power may increase the resilience of transmissions via the path segment connecting these two nodes and may reduce the impact of the possible transient event 262. In some example embodiments, while the modified provisioning instructions 370 may include changes to existing path segments against the base provisioning instructions 360, these changes are shown to shorten at least one path segment that may be able to employ higher bitrates as a result. Thus, from a global optimization perspective of the optical network 100, the modified provisioning instructions 370 may further allow other optical channels to be transmitted between the node D and the node E to increase their transient resilience.

In the base provisioning instructions 360, the overall cost of the optical channel transmission may be equal to $C_e + \varepsilon_e$. In the base modified provisioning instructions 370, the overall cost of the two optical channel transmissions may be equal to two costs equal to $C_e - \varepsilon_e$. Thus, in comparing the overall cost of the base provisioning instructions 360 and the modified provisioning instructions 370, the modified provisioning instructions 370 are shown to be the less costly provisioning for the optical network 100.

Backup Routes

In one or more example embodiments, the transient proofness thresholds 278 may be generated to dynamically re-calculate backup routes for existing optical channels (e.g., the optical channels 144). In this instance, the transient proofness thresholds 278 may be used to trigger updated calculations of protection paths and/or restoration routes for optical channels currently deployed in the optical network 100.

As a non-limiting example, the weights of the transient proofness thresholds 278 may be adjusted to bias the routing of the backup routes by:

Enabling re-routing of protection paths (e.g., active backup channels) through path segments that may provide better transient proofness (e.g., better transient transmission resilience by avoiding transmissions through critical links or path segments identified in the channel risk map 256).

Selecting restoration routes (e.g., standby backup optical channels) to ensure that a fast turn-up of restoration optical channels may not cause a transient event by itself. This may occur if multiple optical channels are restored on a same link or path segment simultaneously, as a large power change of newly added channels may affect previously existing channels on that link.

In selecting restoration routes, the transient proofness thresholds 278 may bias the calculation of restoration routes to:

Spread the restoration optical channels to limit power added over any single path segment;

Route the restoration optical channels preferentially through path segments with power profiles determined to be less susceptible to transient events; and Select wavelengths for the restoration channels that are determined to lead to more reduced impact in transient responses in the optical network 100.

In these backup routes, the routing and spectrum assignment engine 246 may re-calculate the protection paths and/or restoration routes dynamically. The protection paths and/or restoration routes may be triggered by changes in a current network state (e.g., addition/removal of channels), changes in an overall performance of one or more specific network elements and components (e.g., due to ageing).

Example Method of Transmitting Provisioning Instructions

Figure 4A:
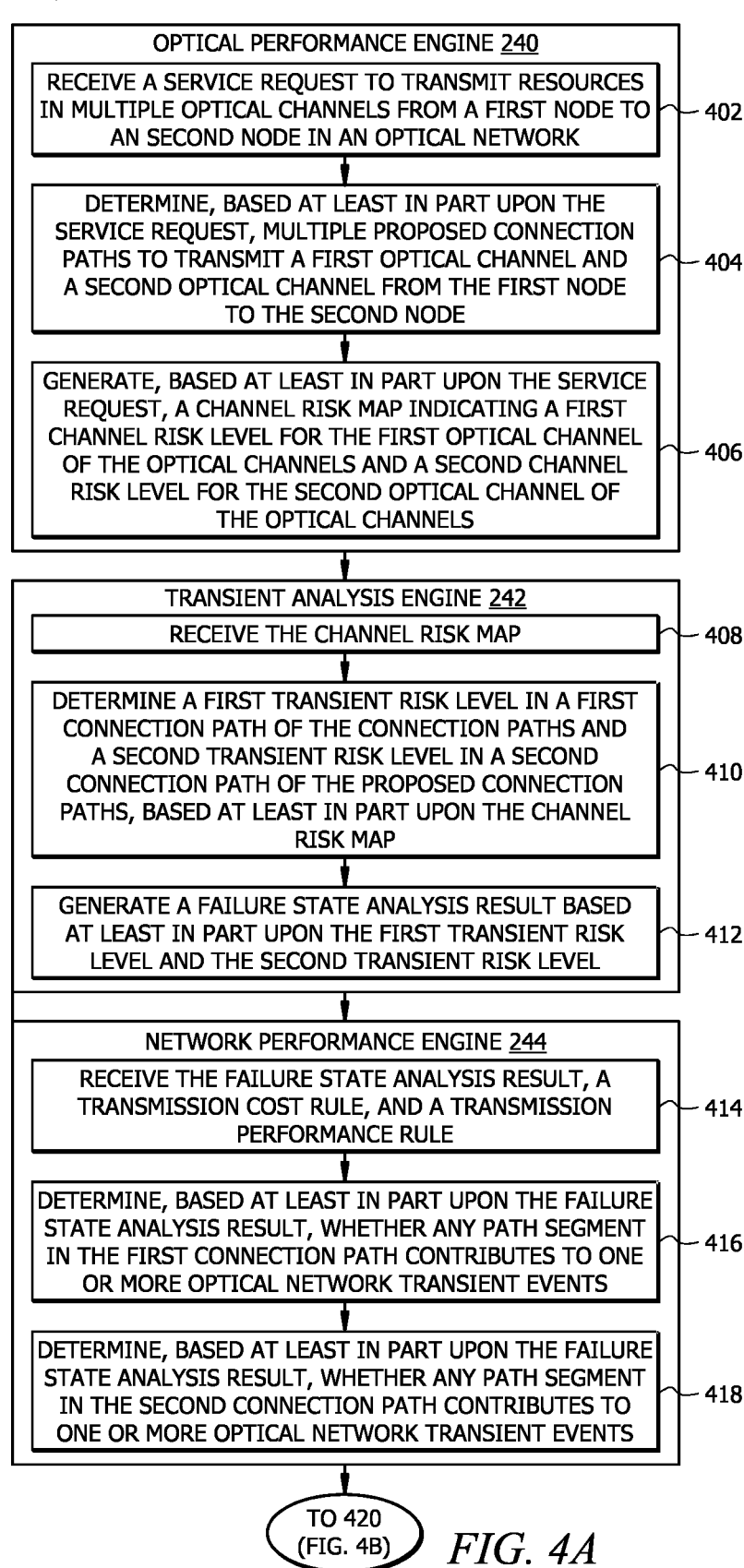

FIGS. 4A and 4B illustrate an example flowchart of a process 400 for providing transient resilient transmissions in the optical network 100 in accordance with one or more example embodiments. In one or more example embodiments, the process 400 enables transient resilient transmissions that extend an optical network capacity by increasing the availability of more usable spectrum in optical channels, because less non-traffic carrying spectrum may be allocated for the sole purpose of guaranteeing transient resilience in the different network links. In some example embodiments, the process 400 may increase the flexibility to control the impact of the provisioning instructions 222 on demand routing decisions. For example, the process 400 may limit or expand a degree of freedom associated with customizing a demand routing and resource provisioning to jointly address traffic and transient resilience requirements by controlling the system static provisioning policies 350.

One or more blocks in FIGS. 4A and 4B may be performed by one or more components as described in FIGS. 1-3 (e.g., the one or more processors 212 in the PCE 210). While the various blocks in FIGS. 4A and 4B are presented and described sequentially, one of ordinary skill in the art will appreciate that some or all of the blocks may be executed in different orders, may be combined or omitted, and some or all of the blocks may be executed in parallel. Furthermore, the blocks may be performed actively or passively.

The process 400 starts at block 402, where the optical performance engine 240 comprise receiving the service request 146 to transmit multiple optical channels 144 from the first node 148 to the second node 150 in the optical network 100. For example, the service request 146 may request connectivity between the node A and the node E as shown in FIG. 2 by the service request (A-E). The service request 146 may indicate the bitrate 234 for transmitting resources in one or more optical channels 144 from the first node 148 to the second node 150.

At block 404, the optical performance engine 240 may comprise determining, based at least in part upon the service request 146, multiple proposed connection paths 252 (e.g., such as possible connection paths 152-156 shown in FIG. 1) to transmit a first optical channel and a second optical channel from the first node 148 to the second node 150. Staying with the example of FIG. 2, the optical performance engine 240 may determine that the optical channels 144 may be transmitted from the node A to the node E following multiple proposed connection paths 252. In this regard, a first connection path may be following the nodes A-E in sequence. Further, a second connection path may be following the node A, the nodes G-I, and the node E in sequence.

At block 406, the optical performance engine 240 may comprise generating, based at least in part upon the service request 146, the channel risk map 256 indicating a first channel risk level 258 for the first optical channel of the optical channels 144 and a second channel risk level 258 for the second optical channel of the optical channels 144. As described above, the channel risk map 256 may identify optical channels at risk of failure or degraded performance in the proposed connection paths 252 (e.g., which may be affected not by the failure itself, but by the optical network 100 response to the failure). For example, the optical channels 144 may be at risk of failure in the first connection path or the second connection path if the path segment between the node D or the node F fails.

The process 400 continues at block 408, where the transient analysis engine 242 comprise receiving the channel risk map 256. At block 410, the transient analysis engine 242 comprise determining a first transient risk level 264 in a first connection path of the proposed connection paths 252 and a second transient risk level 264 in a second connection path of the proposed connection paths 252, based at least in part upon the channel risk map 256. As described above, the transient risk levels 264 provide a likelihood of losing one or more optical channels 144 as a result of one or more possible transient events 262 in any of the path segments in the optical network 100.

At block 412, the transient analysis engine 242 may comprise generating the failure state analysis result 268 based at least in part upon the first transient risk level 264 and the second transient risk level 264. As described above, the failure state analysis result 268 may be generated to include the impact of possible transient events 262 in each path segment in the connection paths evaluated from the proposed connection paths 252.

The process 400 continues at block 414, where the network performance engine 244 may comprise receiving the failure state analysis result 242, the transmission cost rule 272, and the transmission performance rule 274. The transmission cost rule 272 may indicate guidelines associated with a funding cost of transmission. The transmission cost rule 272 may indicate a budget allotted for the transient resilient transmission of the optical channels 144. The transmission performance rule 274 may indicate guidelines associated with estimated reliability corresponding to each of the evaluated connection paths. The transmission performance rule 274 may be a value representing an acceptable failure probability threshold of a connection path selected for the transmission of the optical channels 144.

At block 416, the network performance engine 244 may comprise determining, based at least in part upon the failure state analysis result 268, whether any path segment in the first connection path contributes to one or more optical network transient events (e.g., the possible transient events 262, in this example embodiment). Further, at block 418, the network performance engine 244 determines, based at least in part upon the failure state analysis result 268, whether any path segment in the second connection path contributes to the one or more optical network transient events (once again, e.g., the possible transient events 262, in this example embodiment).

At block 420, the network performance engine 244 may comprise generating multiple transient proofness thresholds 278 based at least in part upon the transmission cost rule 272, the transmission performance rule 274, the determination of any path segment in the first connection path that contributes to the one or more optical network transient events, and the determination of any path segment in the second connection path that contributes to the one or more optical network transient events. In this regard, each transient proofness threshold 278 may be associated with a corresponding path segment of the proposed connection paths.

The process 400 continues at block 422, the routing and spectrum assignment engine 246 may comprise receiving the transient proofness thresholds 278 and a base provisioning policy 282 that comprises a first base cost 284 for a first multitude of segments corresponding to the first connection path and a second multitude of segments corresponding to a second base 284 cost for the first connection path.

At block 424, the routing and spectrum assignment engine 246 may comprise modifying, into a modified first base cost 288, the first base cost 284 by a first transient proofness threshold 278 corresponding to a first path segment in the first connection path. As shown in the example of FIG. 3, a base cost 284 of $C_e$ corresponding to a possible path segment between the node A and the node D may be modified into a modified cost $C_e - \varepsilon_e$. The modification may occur in accordance with a transient proofness threshold $-\varepsilon_e$ for a specific path segment in a proposed connection path 252 from the node A to the node E via the node D.

At block 426, the routing and spectrum assignment engine 246 may comprise modifying, into a modified second base cost 288, the second base cost 284 by a second transient proofness threshold 278 corresponding to a second path segment in the second connection path. As shown in the example of FIG. 3, a base cost 284 of $C_e$ corresponding to a possible path segment between the node B and the node E may be modified into a modified cost $C_e + \varepsilon_e$. The modification may occur in accordance with a transient proofness threshold $+\varepsilon_e$ for a specific path segment in a proposed connection path 252 from the node A to the node E via the node B.

At block 428, the routing and spectrum assignment engine 246 may comprise comparing the modified first base cost 288 of $C_e - \varepsilon_e$ to the modified second base cost 288 of $C_e + \varepsilon_e$. Further, at block 430, in response to the comparison, the routing and spectrum assignment engine 246 selects the modified first base cost 288 or the modified second base cost 288.

At block 432, in response to selecting the modified first base cost, the routing and spectrum assignment engine 246 may comprise transmitting the optical channels 144 from the first node 148 to the second node 150 using the first connection path. Further, at block 434, in response to selecting the modified second base cost, the routing and spectrum assignment engine 246 may comprise transmitting the optical channels from the first node 148 to the second node 150 using the second connection path. In this regard, the values of the modified base costs 288 are compared and a lower value may be selected. In the aforementioned example and the example of FIG. 3, the lower value may be the modified first base cost 288 of $C_e - \varepsilon_e$.

Example improvements provided by the Path Computation Element

Figure 5:
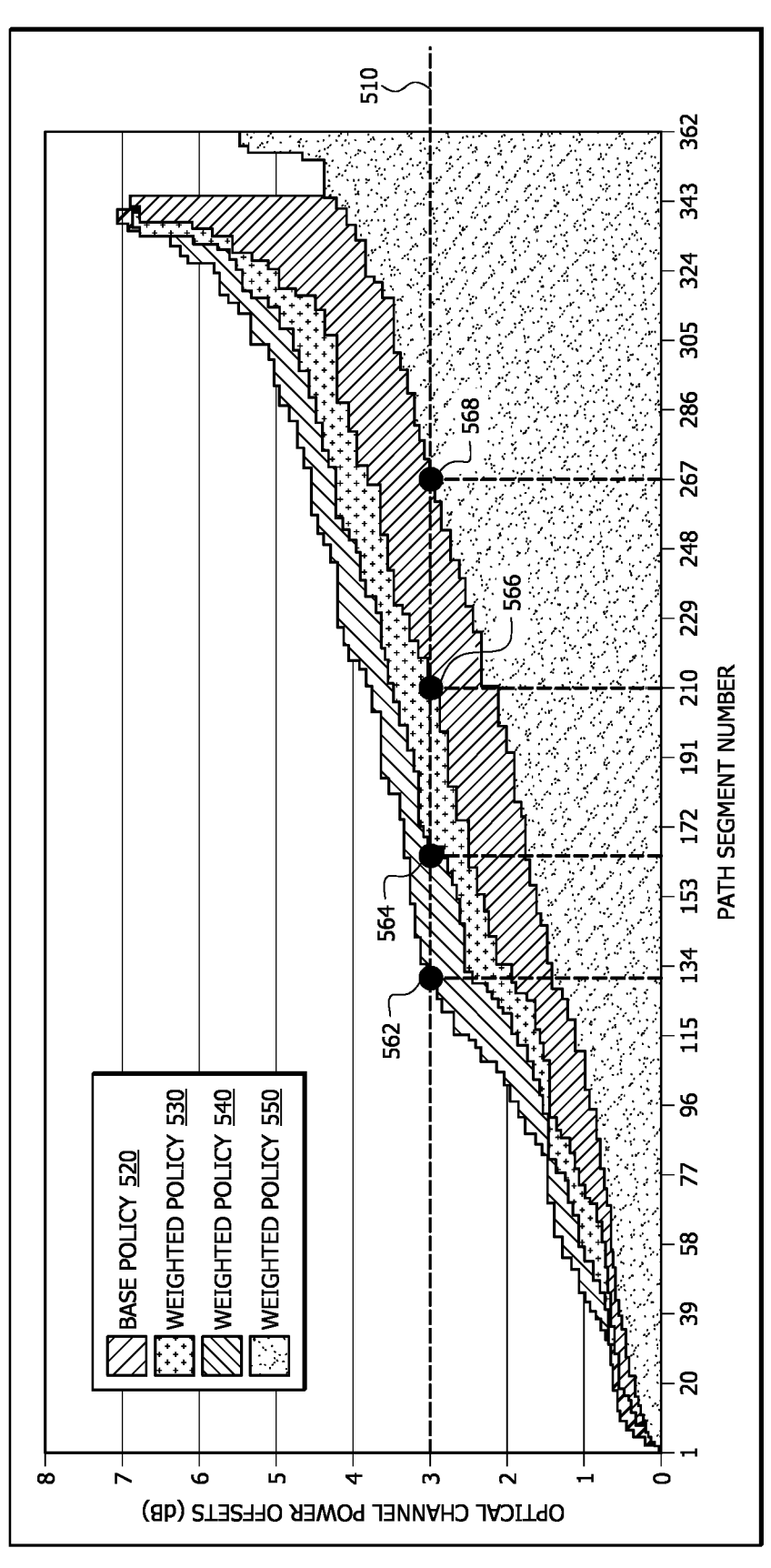
FIG. 5 is a graph illustrating example maximum power offsets for multiple proposed connection paths ranked in accordance with corresponding transient proofness thresholds.

FIG. 5 is a graph 500 illustrating optical channel power offsets resulting from a single link failure (e.g., one optical channel transient event) at multiple path segments in the optical network 100. In one or more example embodiments, the optical channel power offsets increase over a given number of path segments. Graph 500 includes a range for possible optical channel power offsets between 0 dB and 8 dB, inclusive. Further, graph 500 includes a tolerance level 510 representative of a maximum offset that may be acceptable in the optical channel. In the example of graph 500, the tolerance level 510 is based at least in part upon one or more policies associated to the transmission of optical channels 144 in the optical network 100. In this regard, while the example of graph 500 shows the tolerance level 510 at 3 dB, the tolerance level 510 may be higher or lower than 3 dB depending on the current policies and rules for optical channel transmissions in the optical network 100.

In the example of FIG. 5, the optical channel power offsets increase as the number of the path segments increases when a single link failure is triggered. As described above, an effect (e.g., transient) resulting from one possible transient event may propagate and increase throughout multiple elements of the optical network 100. However, in graph 500, the impact of the single link failure is shown to be reduced from a base policy 520 depending on provisioning instructions implemented for different weighted policies 530-550. In this case, the different weighted policies 530-550 represent additional restrictions to transmissions of the optical channels 144 in the optical network 100. For each of these weighted policies 530-550, the network performance engine 244 may generate transient proofness thresholds 278 that provide increasingly transient resilient provisioning to the path segments in the optical network 100. The weighted policy 530 may include a small number of policies and rules that cause the provisioning instructions 222 generated to marginally improve transient resilience transmissions in the optical network 100. When compared to the base policy 520, which includes only existing routing in the optical network 100, the weighted policy 530 reaches the tolerance level 510 at around path segment 172 (at point 564). The base policy 520 reaches the tolerance level at around path segment 134 (at point 562). A comparison of the base policy 520 and the weighted policy 530 shows that the optical network 100 is marginally more transient resilient under the provisioning instructions provided to obtain the weighted policy 530 because the tolerance level 510 is shown to be reached at a later path segment number under the weighted policy 530.

Similarly, the weighted policy 540 and the weighted policy 550 may include yet more additional policies and rules that cause the provisioning instructions 222 generated to further improve transient resilience transmissions in the optical network 100. When compared to the base policy 520, the weighted policy 540 reaches the tolerance level 510 at around path segment 210 (at point 566) and the weighted policy 550 reaches the tolerance level 510 at around path segment 267 (at point 568). The base policy 520 reaches the tolerance level at around path segment 134 (at point 562). A comparison of the base policy 520 and the weighted policies 540 and 550 shows that the optical network 100 is additionally more transient resilient under the provisioning instructions provided to obtain these weighted policies.

In the example of FIG. 5, the transient proofness thresholds 278 are generated assuming a given level of additional path segments and nodes may be provisioned to improve the transient resilience of the optical network 100. In graph 500, weighting factors of 0, 0.01 and 0.05, are used to modify the base costs 284 for the weighted policies 530-550, respectively. In this case, a weighting factor of 0 for the weighting policy 530 results from maintaining base costs 284 in existing routes (e.g., no extra transponders are added but routing is optimized to favor transient resilient solutions within the allowed limits, such as those shown under the base provisioning instructions 360 in reference to FIG. 3). Graph 500 shows that even with a weighting factor of 0 (e.g., no extra interfaces), transient resilience is increased via a 0.5 dB average power offset reduction per optical channel.

Computer System Overview

Figure 6:
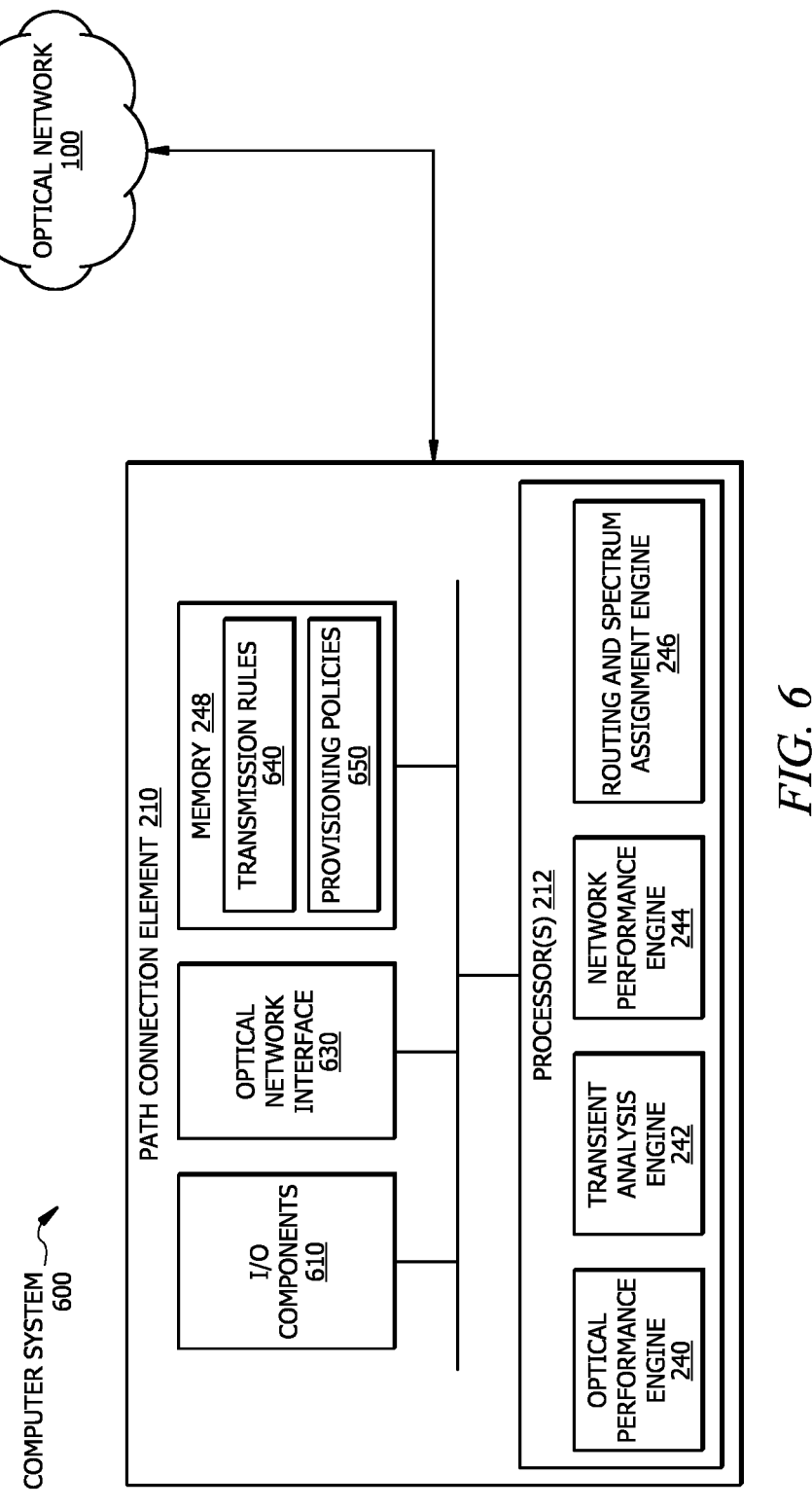
FIG. 6 illustrates an example embodiment of an apparatus, such as a Path Computation Element (PCE), of the system of FIG. 2 in accordance with one or more example embodiments.

FIG. 6 illustrates an example embodiment of a computer system 600 including the optical communication system 200 of FIG. 2. FIG. 6 illustrates an example embodiment of a computer system 600 that is configured to reduce a possibility of transient events in the optical network 100 by adaptively provisioning instructions 222 for routing resources in the optical network 100. The computer system 600 may include the PCE 210 described in reference to FIG. 2. The PCE 210 may route the one or more optical channels 144 through a specific connection path in accordance with one or more provisioning instructions 222. As described in reference to FIGS. 2-4, the provisioning instructions 222 (e.g., the base provisioning instructions 360 or the modified provisioning instructions 370) are determined based at least in part upon the service request 146 for transmitting the one or more optical channels 144 between the first node 148 and the second node 150 and information relating to a configuration and capabilities of the one or more optical channels 144.

In one or more example embodiments, the computing system 600 may be any system that is configured to process data and interact with the optical network 100. Examples of the computing system 600 include, but are not limited to, a personal computer, a desktop computer, a workstation, a server, a laptop, a tablet computer, or any other suitable type of device. The computing system 600 may include the PCE 210.

Input/Output Components

In the computing system 600, the PCE 210 may include one or more Input (I)/Output (O) components 610, such as a display, a microphone, a camera, keypad, or other appropriate terminal equipment usable to receive input/output signaling (such as the service request 146 from the service request input component 214). In the example of FIG. 6, the PCE 210 may include the one or more processors 212, the memory 248, and/or circuitry (not explicitly shown) configured to perform one or more of the functions or actions of the computing system 600 described herein. For example, a software application designed using software code may be stored in the memory 248 and executed by the one or more processors 212 to perform the functions of the computing system 600. The computing system 600 is configured to communicate with devices and components of the optical network 100.

Processors

The PCE 210 may include the one or more processors 212 communicatively coupled with the I/O components 610 and an optical network interface 630. Further, the one or more processors 212 may include one or more processors communicatively coupled to the memory 248. The one or more processors 212 may be one or more electronic circuitries, including, but not limited to, state machines, one or more central processing unit (CPU) chips, logic units, cores (e.g., one or more multi-core processors), field-programmable gate array (FPGAs), or application-specific integrated circuits (ASICs). For example, the one or more processors 212 may be implemented in cloud devices, servers, virtual environments, and the like. The one or more processors 212 may be a programmable logic device, a microcontroller, a microprocessor, or one or more suitable combination of the preceding. The one or more processors 212 are configured to process data and may be implemented in hardware or software. In some example embodiments, the one or more processors 212 is coupled to the I/O components 610 via a system bus. The one or more processors 212 may be further coupled to an optical network interface 630 via the same system bus. The one or more processors 212 may communicate with other elements of the optical network 100 via the optical network interface 630, such as, for example, network nodes. The one or more processors 212 may include an internal clock (not shown) to keep track of time, periodic time intervals, and the like.

In some example embodiments, the one or more processors 212 is configured to perform one or more of the functions described in reference to the optical performance engine 240, the transient analysis engine 242, the network performance engine 244, and the routing and spectrum assignment engine 246.

Those skilled in the art will readily understand from this disclosure that in many instances throughout this disclosure, the phrase "the one or more processors 212"—as used for example in reference to a given one of the various disclosed implementations or configurations associated with "the one or more processors 212"—shall not be construed so as to necessarily require, in an example embodiment that employs a plurality of processors 212, that every one of such plurality of processors 212 associate with the given implementation or configuration. In example embodiments that comprise one or more processors 212, for example, each one of such one or more processors 212 might not be used to implement each of the optical performance engine 240, the transient analysis engine 242, the network performance engine 244, and the routing and spectrum assignment engine 246. Indeed, such given implementation or configuration may instead associate with only a given one processor, or a given subset of processors, among such plurality of processors 212 that an example embodiment comprises. Moreover, such given one processor, or subset of processors, may be the same as, or different in whole or in part from, a processor or subset of processors, among such plurality of processors 212, that may associate with another given one of the various disclosed implementations or configurations that associate with "the one or more processors 212."

Optical Network Interface

The optical network interface 630 is configured to enable wired and/or wireless communications with one or more devices in the optical network 100. The optical network interface 630 may be configured to communicate data between the PCE 210 and other devices, systems, or domains. For example, the optical network interface 630 may comprise an NFC interface, a Bluetooth interface, a Zigbee interface, a Z-wave interface, a radio-frequency identification (RFID) interface, a WIFI interface, a LAN interface, a WAN interface, a MAN interface, a PAN interface, a WPAN interface, a modem, a switch, and/or a router.

Memory

The memory 248 may have a computer-readable medium coupled to the one or more processors 212 via the system bus. The memory 248 is used by the one or more processors 212 to store and read/write data, as well as computer program instructions used to implement the procedure(s)

described herein and shown in the accompanying drawing(s) herein (and, in one example, to implement the functions represented in FIGS. 1-4B. The memory 248 may be used by the one or more processors 212 to store other types of data, such as, by example only, network-related information, as described above. In operation, the one or more processors 212 may load the program instructions into the memory 248. The one or more processors 212 then may execute the loaded program instructions to perform one or more of the example procedures described herein, for operating the PCE 210.

In some example embodiments, the memory 248 is configured to include one or more of the policies described in reference to FIGS. 2-4. For example, the memory 248 may include multiple transmission rules 540 and multiple transmission policies 550. The transmission rules 540 and the transmission policies 550 may include the transmission capabilities 254 described in relation to the optical performance operations 240 in FIG. 2; the transmission cost rule 272 and the transmission performance rule 274 described in relation to the network performance operations 244 in FIG. 2; base provisioning policy 282 described in relation to the routing and spectrum assignments 246 in FIG. 2; and/or the system static provisioning policies 350 described in FIG. 3.

Scope of the Disclosure

The foregoing description and the figures merely serve to illustrate the invention and example embodiments thereof, but should not be understood to imply one or more limitations.

The invention claimed is:

1. A system, comprising:

at least one processor configured to:

receive a service request to transmit at least one optical channel from a first node to a second node in an optical network;

determine, based at least in part upon the service request, a plurality of proposed connection paths to transmit each of a first optical channel and a second optical channel from the first node to the second node; and generate, based at least in part upon the service request, a channel risk map indicating a first channel risk level for the first optical channel of the at least one optical channel and a second channel risk level for the second optical channel of the at least one optical channel;

determine a first transient risk level in a first connection path of the plurality of proposed connection paths and a second transient risk level in a second connection path of the plurality of proposed connection paths, based at least in part upon the channel risk map;

generate a failure state analysis result based at least in part upon the first transient risk level and the second transient risk level;

obtain a transmission cost rule and a transmission performance rule;

determine, based at least in part upon the failure state analysis result, whether at least one path segment in the first connection path contributes to at least one transmission performance risk presented by at least one optical network transient event;

determine, based at least in part upon the failure state analysis result, whether at least one path segment in the second connection path contributes to at least one transmission performance risk presented by the at least one optical network transient event;

generate a plurality of transient proofness thresholds based at least in part upon the transmission cost rule, the transmission performance rule, the determination of at least one path segment in the first connection path that contributes to at least one transmission performance risk presented by the at least one optical network transient event, and the determination of at least one path segment in the second connection path that contributes to at least one transmission performance risk presented by the at least one optical network transient event, wherein each transient proofness threshold of the plurality of transient proofness thresholds is associated with a corresponding path segment of the plurality of proposed connection paths;

obtain a base provisioning policy that comprises a first base cost for a first plurality of path segments corresponding to the first connection path and a second base cost for a second plurality of path segments corresponding to the second connection path;

modify, into a modified first base cost, the first base cost by a first transient proofness threshold corresponding to a first path segment in the first connection path;

modify, into a modified second base cost, the second base cost by a second transient proofness threshold corresponding to a second path segment in the second connection path;

compare the modified first base cost to the modified second base cost;

determine a higher one of the modified first base cost and the modified second base cost;

in response to determining that the modified first base cost is higher than the modified second base cost, select the modified second base cost;

in response to determining that the modified second base cost is higher than the modified first base cost, select the modified first base cost;

in response to selecting the modified first base cost, transmit the at least one optical channel from the first node to the second node using the first connection path; and in response to selecting the modified second base cost, transmit the at least one optical channel from the first node to the second node using the second connection path; and a memory, communicatively coupled with the at least one processor and configured to store the transmission cost rule and the transmission performance rule, wherein:

the transmission cost rule indicates guidelines associated with a funding cost of transmissions; and the transmission performance rule indicates guidelines associated with a first estimated reliability corresponding to the first connection path and a second estimated reliability corresponding to the second connection path.

2. The system of claim 1, wherein:

the first channel risk level represents a risk of failure of the first optical channel in response to the at least one optical network transient event;

the second channel risk level represents a risk of failure of the second optical channel in response to the at least one optical network transient event; and the at least one optical network transient event comprises at least one event in which at least one transient is introduced in the optical network.

3. The system of claim 1, wherein:

the service request comprises a bitrate for transmission of the at least one optical channel.

4. The system of claim 3, wherein the at least one processor is further configured to:

evaluate, based at least in part upon the service request, a plurality of transmission capabilities of the optical network, the plurality of transmission capabilities comprising wavelength capability information, bitrate capability information, and topology information of the optical network; and generate, based at least in part upon the bitrate and the plurality of transmission capabilities of the optical network, the channel risk map indicating the first channel risk level for the first optical channel and the second channel risk level for the second optical channel.

5. The system of claim 1, wherein:

the first transient proofness threshold indicates at least one of:

a first increase to the first base cost corresponding to the first path segment in the first connection path; and a first decrease to the first base cost corresponding to the first path segment in the first connection path; and the second transient proofness threshold indicates at least one of:

a second increase to the second base cost corresponding to the second path segment in the second connection path; and a second decrease to the second base cost corresponding to the second path segment in the second connection path.

6. An apparatus communicatively coupled to a plurality of nodes in an optical network, comprising:

an optical performance engine implemented by at least one processor configured to:

receive a service request to transmit at least one optical channel from a first node to a second node in the optical network;

determine, based at least in part upon the service request, a plurality of proposed connection paths to transmit from the first node to the second node a first optical channel of the at least one optical channel and a second optical channel of the at least one optical channel; and generate, based at least in part upon the service request, a channel risk map indicating a first channel risk level for the first optical channel of the at least one optical channel and a second channel risk level for the second optical channel of the at least one optical channel;

a transient analysis engine communicatively coupled to the optical performance engine and implemented by the at least one processor configured to:

receive the channel risk map;

determine a first transient risk level in a first connection path of the plurality of proposed connection paths and a second transient risk level in a second connection path of the plurality of proposed connection paths, based at least in part upon the channel risk map; and generate a failure state analysis result based at least in part upon the first transient risk level and the second transient risk level;

a network performance engine communicatively coupled to the transient analysis engine and implemented by the at least one processor configured to:

receive the failure state analysis result, a transmission cost rule, and a transmission performance rule;

determine, based at least in part upon the failure state analysis result, whether at least one path segment in the first connection path contributes to at least one transmission performance risk presented by at least one optical network transient event;

determine, based at least in part upon the failure state analysis result, whether at least one path segment in the second connection path contributes to at least one transmission performance risk presented by the at least one optical network transient event; and generate a plurality of transient proofness thresholds based at least in part upon the transmission cost rule, the transmission performance rule, the determination of at least one path segment in the first connection path that contributes to at least one transmission performance risk presented by the at least one optical network transient event, and the determination of at least one path segment in the second connection path that contributes to at least one transmission performance risk presented by the at least one optical network transient event, wherein each transient proofness threshold of the plurality of transient proofness thresholds is associated with a corresponding path segment of the plurality of proposed connection paths; and a routing and spectrum assignment engine communicatively coupled to the network performance engine and implemented by the at least one processor configured to:

receive the plurality of transient proofness thresholds and a base provisioning policy that comprises a first base cost for a first plurality of path segments corresponding to the first connection path and a second base cost for a second plurality of path segments corresponding to the second connection path;

modify, into a modified first base cost, the first base cost by a first transient proofness threshold corresponding to a first path segment in the first connection path;

modify, into a modified second base cost, the second base cost by a second transient proofness threshold corresponding to a second path segment in the second connection path;

compare the modified first base cost to the modified second base cost;

determine a higher one of the modified first base cost and the modified second base cost;

in response to determining that the modified first base cost is higher than the modified second base cost, select the modified second base cost;

in response to determining that the modified second base cost is higher than the modified first base cost, select the modified first base cost;

in response to selecting the modified first base cost, transmit the at least one optical channel from the first node to the second node using the first connection path; and in response to selecting the modified second base cost, transmit the at least one optical channel from the first node to the second node using the second connection path.

7. The apparatus of claim 6, wherein:

the first channel risk level represents a risk of failure of the first optical channel in response to the at least one optical network transient event;

the second channel risk level represents a risk of failure of the second optical channel in response to the at least one optical network transient event; and the at least one optical network transient event comprises at least one event in which a transient is introduced in the optical network.

8. The apparatus of claim 7, wherein:

the at least one event of the at least one optical network transient event is at least one of a connection path interruption and a power connection surge; and the at least one processor implementing the optical performance engine is further configured to:

generate, based at least in part upon a plurality of transmission capabilities of the optical network in the service request, the plurality of proposed connection paths to transmit each of the first optical channel and the second optical channel from the first node to the second node.

9. The apparatus of claim 6, wherein:

the service request comprises a bitrate for transmission of the at least one optical channel;

the at least one processor implementing the optical performance engine is further configured to:

evaluate, based at least in part upon the service request, a plurality of transmission capabilities of the optical network, the plurality of transmission capabilities comprising wavelength capability information, bitrate capability information, and topology information of the optical network; and generate, based at least in part upon the bitrate and the plurality of transmission capabilities of the optical network, the channel risk map indicating the first channel risk level for the first optical channel and the second channel risk level for the second optical channel.

10. The apparatus of claim 9, wherein:

the wavelength capability information indicates a plurality of wavelength transmission capabilities for the first node, the second node, and a plurality of additional nodes in the optical network;

the bitrate capability information indicates a plurality of bitrate transmission capabilities for the first node, the second node, and the plurality of additional nodes in the optical network; and the topology information represents interconnections between the first node, the second node, and the plurality of additional nodes.

11. The apparatus of claim 10, wherein the at least one processor implementing the routing and spectrum assignment engine is further configured to:

in response to selecting the modified first base cost, transmit adaptive provisioning instructions to the optical network to anchor at least one of the first node, the second node, and another node of the plurality of additional nodes.

12. The apparatus of claim 10, wherein the at least one processor implementing the transient analysis engine is further configured to:

receive an updated topology information of the optical network comprising changes to the topology information of the optical network in response to at least one of:

transmitting the at least one optical channel from the first node to the second node using the first connection path; and transmitting the one or more optical channels from the first node to the second node using the second connection path; and determine the first transient risk level in the first connection path of the plurality of proposed connection paths and the second transient risk level in the second connection path of the plurality of proposed connection paths, based at least in part upon the channel risk map and the updated topology information of the optical network.

13. The apparatus of claim 6, wherein the failure state analysis result comprises:

a first impact of the at least one optical network transient event in the first connection path; and a second impact of the at least one optical network transient event in the second connection path.

14. The apparatus of claim 6, wherein:

the first transient risk level indicates a first possibility of the at least one optical network transient event in the first connection path; and the second transient risk level indicates a second possibility of the at least one optical network transient event in the second connection path.

15. The apparatus of claim 6, wherein:

the transmission cost rule indicates guidelines associated with a funding cost of transmissions; and the transmission performance rule indicates guidelines associated with a first estimated reliability corresponding to the first connection path and a second estimated reliability corresponding to the second connection path.

16. The apparatus of claim 6, wherein:

the first transient proofness threshold indicates at least one of:

a first increase to the first base cost corresponding to the first path segment in the first connection path; and a first decrease to the first base cost corresponding to the first path segment in the first connection path; and the second transient proofness threshold indicates at least one of:

a second increase to the second base cost corresponding to the second path segment in the second connection path; and a second decrease to the second base cost corresponding to the second path segment in the second connection path.

17. A method, comprising:

receiving a service request to transmit at least one optical channel from a first node to a second node in an optical network;

determining, based at least in part upon the service request, a plurality of proposed connection paths to transmit each of a first optical channel and a second optical channel from the first node to the second node;

generating, based at least in part upon the service request, a channel risk map indicating a first channel risk level for the first optical channel of the at least one optical channel and a second channel risk level for the second optical channel of the at least one optical channel;

determining a first transient risk level in a first connection path of the plurality of proposed connection paths and a second transient risk level in a second connection path of the plurality of proposed connection paths, based at least in part upon the channel risk map;

generating a failure state analysis result based at least in part upon the first transient risk level and the second transient risk level;

receiving a transmission cost rule and a transmission performance rule;

determining, based at least in part upon the failure state analysis result, whether at least one path segment in the first connection path contributes to at least one transmission performance risk presented by at least one optical network transient event;

determining, based at least in part upon the failure state analysis result, whether at least one path segment in the second connection path contributes to at least one transmission performance risk presented by the at least one optical network transient event;

generating a plurality of transient proofness thresholds based at least in part upon the transmission cost rule, the transmission performance rule, the determination of at least one path segment in the first connection path that contributes to at least one transmission performance risk presented by the at least one optical network transient event, and the determination of at least one path segment in the second connection path that contributes to at least one transmission performance risk presented by the at least one optical network transient event, wherein each transient proofness threshold of the plurality of transient proofness thresholds is associated with a corresponding path segment of the plurality of proposed connection paths;

receiving a base provisioning policy that comprises a first base cost for a first plurality of path segments corresponding to the first connection path and a second base cost for a second plurality of path segments corresponding to the second connection path;

modifying, into a modified first base cost, the first base cost by a first transient proofness threshold corresponding to a first path segment in the first connection path;

modifying, into a modified second base cost, the second base cost by a second transient proofness threshold corresponding to a second path segment in the second connection path;

comparing the modified first base cost to the modified second base cost;

determining a higher one of the modified first base cost and the modified second base cost;

in response to determining that the modified first base cost is higher than the modified second base cost, selecting the modified second base cost;

in response to determining that the modified second base cost is higher than the modified first base cost, selecting the modified first base cost;

in response to selecting the modified first base cost, transmitting the at least one optical channel from the first node to the second node using the first connection path; and in response to selecting the modified second base cost, transmitting the at least one optical channel from the first node to the second node using the second connection path.

18. The method of claim 17, wherein:

the first channel risk level represents a risk of failure of the first optical channel in response to the at least one optical network transient event;

the second channel risk level represents a risk of failure of the second optical channel in response to the at least one optical network transient event; and the at least one optical network transient event comprises at least one event in which a transient is introduced in the optical network.

19. The method of claim 17, wherein:

the service request comprises a bitrate for transmission of the at least one optical channel.

20. The method of claim 17, wherein:

the first transient proofness threshold indicates at least one of:

a first increase to the first base cost corresponding to the first path segment in the first connection path; and a first decrease to the first base cost corresponding to the first path segment in the first connection path; and the second transient proofness threshold indicates at least one of:

a second increase to the second base cost corresponding to the second path segment in the second connection path; and a second decrease to the second base cost corresponding to the second path segment in the second connection path.

\* \* \* \* \*